United States Patent
Aiba et al.

(10) Patent No.: US 9,094,165 B2
(45) Date of Patent: *Jul. 28, 2015

(54) MOBILE COMMUNICATION SYSTEM, BASE STATION APPARATUS, MOBILE STATION APPARATUS AND COMMUNICATION METHOD

(71) Applicant: Sharp Kabushiki Kaisha, Osaka-shi, Osaka (JP)

(72) Inventors: Tatsushi Aiba, Osaka (JP); Shoichi Suzuki, Osaka (JP); Wataru Ouchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,575

(22) Filed: Oct. 23, 2014

(65) Prior Publication Data
US 2015/0043501 A1 Feb. 12, 2015

Related U.S. Application Data

(63) Continuation of application No. 13/643,340, filed as application No. PCT/JP2011/057862 on Mar. 29, 2011, now Pat. No. 8,897,228.

(30) Foreign Application Priority Data

Apr. 26, 2010 (JP) ................................ 2010-100543

(51) Int. Cl.
*H04W 72/04* (2009.01)
*H04W 72/12* (2009.01)
*H04L 5/00* (2006.01)
(Continued)

(52) U.S. Cl.
CPC .............. *H04L 5/005* (2013.01); *H04L 5/0051* (2013.01); *H04L 5/0094* (2013.01); *H04L 25/0202* (2013.01); *H04L 25/0224* (2013.01); *H04L 25/0228* (2013.01); *H04W 72/042* (2013.01); *H04W 72/0406* (2013.01); *H04W 72/0413* (2013.01); *H04W 72/1231* (2013.01);
(Continued)

(58) Field of Classification Search
None
See application file for complete search history.

(56) References Cited

U.S. PATENT DOCUMENTS

2010/0303034 A1* 12/2010 Chen et al. ..................... 370/329
2011/0019776 A1* 1/2011 Zhang et al. ................... 375/340
(Continued)

OTHER PUBLICATIONS

Samsung, "Configuring SRS Transmissions in Rel. 10", 3GPP TSG RAN WG1 #59bis, R1-100133, Jan. 19-23, 2010, pp. 1-3.
(Continued)

*Primary Examiner* — Christopher Crutchfield
(74) *Attorney, Agent, or Firm* — Keating & Bennett, LLP

(57) ABSTRACT

Based on a sounding reference signal, a base station apparatus performs efficient scheduling. The base station apparatus includes information for requesting the transmission of the sounding reference signal in a first downlink control information format or a second downlink control information format, and transmits the information to the mobile station apparatus, the mobile station apparatus transmits, based on detection of the information, the sounding reference signal to the base station apparatus, and a first parameter used for the transmission of the sounding reference signal based on the detection of the information included in the first downlink control information format and a second parameter used for the transmission of the sounding reference signal based on the detection of the information included in the second downlink control information format are individually set by a signal of a higher layer transmitted from the base station apparatus.

20 Claims, 9 Drawing Sheets

(51) Int. Cl.
*H04L 25/02* (2006.01)
*H04W 88/02* (2009.01)
*H04W 88/08* (2009.01)

(52) U.S. Cl.
CPC ............ *H04L5/001* (2013.01); *H04W 72/1289* (2013.01); *H04W 88/02* (2013.01); *H04W 88/08* (2013.01)

(56) References Cited

U.S. PATENT DOCUMENTS

2011/0085458 A1* 4/2011 Montojo et al. .............. 370/252
2011/0170497 A1* 7/2011 Lin et al. ....................... 370/329
2011/0171964 A1* 7/2011 Lin et al. ....................... 455/450
2011/0199944 A1* 8/2011 Chen et al. .................... 370/280

OTHER PUBLICATIONS

Panasonic, "SRS Enhancement for LTE-Advanced", 3GPP TSG RAN WG1 Meeting # 60bis, R1-102040, Apr. 12-16, 2010, pp. 1-3.
Aiba et al., "Mobile Communication System, Base Station Apparatus, Mobile Station Apparatus and Communication Method", U.S. Appl. No. 13/643,340, filed Dec. 5, 2012.

* cited by examiner

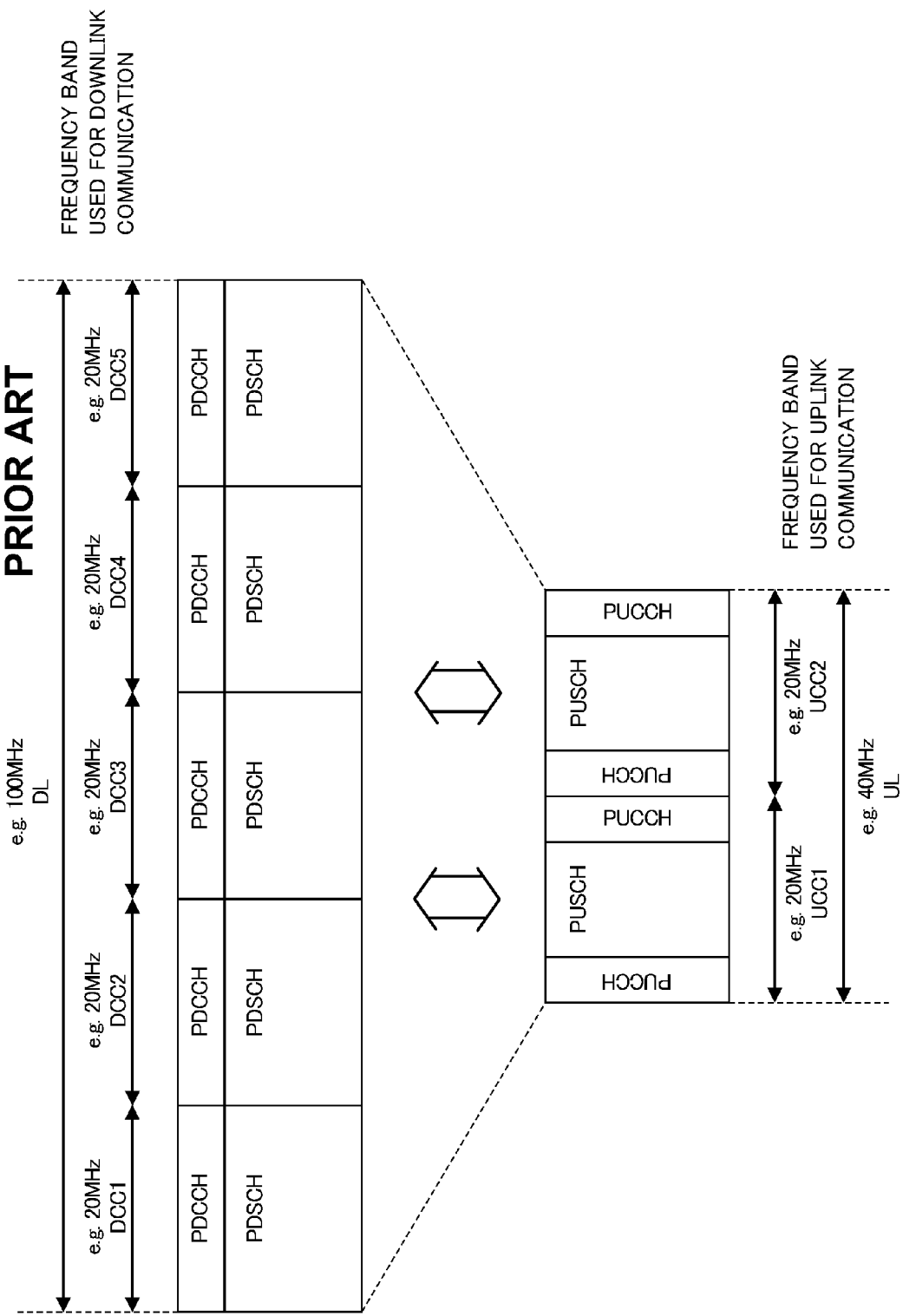

MOBILE COMMUNICATION SYSTEM, BASE STATION APPARATUS, MOBILE STATION APPARATUS AND COMMUNICATION METHOD

TECHNICAL FIELD

The present invention relates to a mobile communication system that is formed with a base station apparatus and a mobile station apparatus, and to a communication method.

BACKGROUND ART

3GPP (3rd Generation Partnership Project) is a project in which the specifications of a mobile communication system based on a network obtained by developing W-CDMA (Wideband-Code Division Multiple Access) and GSM (Global System for Mobile Communications) are examined and produced. In the 3GPP, the W-CDMA method is standardized as a third-generation cellular mobile communication method, and its serves are started one after another. Moreover, HSDPA (High-speed Downlink Packet Access) in which its communication speed is further increased is standardized, and its serves are started. In the 3GPP, the evolution of a third-generation radio access technology (hereinafter also referred to as "LTE (Long Term Evolution" or "EUTRA (Evolved Universal Terrestrial Radio Access") and a mobile communication system (hereinafter also referred to as "LTE-A (Long Term Evolution-Advanced" or "Advanced-EUTRA") in which a wider frequency band is utilized to realize higher speed exchange of data are being examined.

As the communication scheme of the LTE, an OFDMA (Orthogonal Frequency Division Multiple Access) method in which subcarriers orthogonal to each other are used to perform user multiplexing and an SC-FDMA (Single Carrier-Frequency Division Multiple Access) method are being examined. In other words, in the downlink, the OFDMA method, which is a multicarrier communication method, is proposed, and in the uplink, the SC-FDMA method, which is a single carrier communication method, is proposed.

On the other hand, as the communication method of the LTE-A, in the downlink, the introduction of the OFDMA method is being examined, and in the uplink, in addition to the SC-FDMA method, the introduction of a Clustered-SC-FDMA (Clustered-Single Carrier-Frequency Division Multiple Access; which is also referred to as a DFT-s-OFDM with Spectrum Division Control or a DFT-precoded OFDM) method is being examined. In the LTE and the LTE-A, the SC-FDMA method and the Clustered-SC-FDMA method proposed as the uplink communication method can reduce, in the characteristic of the single carrier communication method (due to the single carrier characteristic), a PAPR (Peak to Average Power Ratio: transmission power) when data (information) is transmitted.

While a frequency band used in a general mobile communication system is contiguous, in the LTE-A, it is proposed that a plurality of frequency bands which are contiguous and/or non-contiguous (hereinafter also referred to as a "CC: Component Carrier" or a "CC: Carrier Component") are compositely used and are utilized as one wider frequency band (also referred to as frequency band aggregation: Carrier Aggregation). Moreover, in order for the base station apparatus and the mobile station apparatus to more flexibly use a wider frequency band to perform communication, it is proposed that a frequency band used for downlink communication and a frequency band used for uplink communication are made different in frequency bandwidth (asymmetric frequency band aggregation: Asymmetric carrier aggregation) (non-patent document 1).

FIG. 8 is a diagram illustrating a mobile communication system subjected to frequency band aggregation in a conventional technology. That a frequency band used for downlink (DL: Down Link) communication as shown in FIG. 8 and a frequency band used for uplink (UL: Up Link) communication are made equal in frequency bandwidth is also referred to as symmetric frequency band aggregation (Symmetric carrier aggregation). As shown in FIG. 8, the base station apparatus and the mobile station apparatus compositely use a plurality of component carriers that are contiguous and/or non-contiguous frequency bands, and thereby can perform communication in a wider frequency band which is composed of a plurality of component carriers.

FIG. 8 shows, as an example, that a frequency band (which may be a DL system band (width)) having a bandwidth of 100 MHz and used in the downlink communication, which is composed of five downlink component carriers (DCC1: Downlink Component Carrier1, DCC2, DCC3, DCC4, DCC5) having a bandwidth of 20 MHz. FIG. 8 also shows, as an example, that a frequency band (which may be a UL system band (width)) having a bandwidth of 100 MHz and used in the uplink communication, which is composed of five uplink component carriers (UCC1: Uplink Component Carrier1, UCC2, UCC3, UCC4, UCC5) having a bandwidth of 20 MHz.

In FIG. 8, on each downlink component carrier, downlink channels such as a physical downlink control channel (hereinafter, PDCCH: Physical Downlink Control Channel) and a physical downlink shared channel (hereinafter, PDSCH: Physical Downlink Shared Channel) are mapped.

The base station apparatus uses the PDCCH to allocate (schedule) downlink control information (DCI: Downlink Control Information) for transmitting a downlink transport block transmitted using the PDSCH to the mobile station apparatus, and uses the PDSCH to transmit the downlink transport block to the mobile station apparatus. Here, in FIG. 8, the base station apparatus can transmit, at the maximum, up to five downlink transport blocks (which may be the PDSCH) in the same subframe to the mobile station apparatus.

On each uplink component carrier, uplink channels such as a physical uplink control channel (hereinafter, PUCCH: Physical Uplink Control Channel) and a physical uplink shared channel (hereinafter, PUSCH: Physical Uplink Shared Channel) are mapped.

The mobile station apparatus uses the PDCCH and/or the PUSCH to transmit, to the base station apparatus, uplink control information (UCI: Uplink Control Information) such as channel state information (CSI: Channel Statement Information) indicating the channel state of the downlink, information indicating an ACK/NACK (Positive Acknowledgement/Negative Acknowledgement) of a HARQ (Hybrid Automatic Repeat Request) for the downlink transport block, and scheduling request (SR: scheduling request). Here, in FIG. 8, the mobile station apparatus can transmit, at the maximum, up to five uplink transport blocks (which may be the PUSCH) in the same subframe to the base station apparatus.

Likewise, FIG. 9 is a diagram illustrating a mobile communication system subjected to asymmetric frequency band aggregation in the conventional technology. As shown in FIG. 9, the base station apparatus and the mobile station apparatus make a frequency band used for downlink communication and a frequency band used for uplink communication different in frequency bandwidth, compositely use component carriers that form these frequency bands and that are contiguous and/or non-contiguous frequency bands, and thereby can perform communication in a broad frequency band.

FIG. 9 shows, as an example, that a frequency band having a bandwidth of 100 MHz and used in the downlink communication, which is composed of five downlink component carriers (DCC1, DCC2, DCC3, DCC4, DCC5) having a bandwidth of 20 MHz. FIG. 9 also shows, as an example, that a frequency band having a bandwidth of 40 MHz and used in the uplink communication, which is composed of two uplink component carriers (UCC1 and UCC2) having a bandwidth of 20 MHz.

In FIG. 9, the downlink/uplink channels are mapped on each of the downlink/uplink component carriers, and the base station apparatus uses the PDSCH to allocate (schedule) the PDSCH to the mobile station apparatus, and uses the PDSCH to transmit the downlink transport block to the mobile station apparatus. Here, in FIG. 9, the base station apparatus can transmit, at the maximum, up to five downlink transport blocks (which may be the PDSCH) in the same subframe to the mobile station apparatus.

The mobile station apparatus uses the PUCCH and/or the PUSCH to transmit, to the base station apparatus, the uplink control information such as the channel state information, the information indicating an ACK/NACK of the HARQ for the downlink transport block, and the scheduling request. Here, in FIG. 9, the mobile station apparatus can transmit, at the maximum, up to two uplink transport blocks (which may be the PUSCH) in the same subframe to the base station apparatus.

Furthermore, in the LTE-A, in order for the base station apparatus to measure the uplink channel, an examination is performed in which the mobile station apparatus transmits a reference signal (hereinafter also referred to as a sounding reference signal, SRS: Sounding Reference Signal) to the base station apparatus using the uplink. The base station apparatus schedules, based on the SRS transmitted from the mobile station apparatus, the mobile station apparatus, and performs, for example, the allocation of PUSCH resources, the determination of a modulation scheme to be carried out on the PUSCH and a coding rate and the like.

With respect to the transmission of the SRS by the mobile station apparatus, an examination is performed in which, the base station apparatus provides, for the mobile station apparatus, an instruction (request, trigger) of the transmission of an aperiodic SRS (hereinafter also referred to as an A-SRS: Aperiodic SRS, Dynamic SRS or Scheduled SRS), in addition to the transmission of a periodic SRS (hereinafter also referred to as a P-SRS: Periodic SRS). For example, it is proposed that the base station apparatus uses, for mobile station apparatus, a downlink control information format (hereinafter also referred to as a DCI format, a Downlink grant or a Downlink assignment) for the downlink to provide an instruction of the transmission of the A-SRS (non-patent document 2). For example, it is proposed that the base station apparatus uses, for mobile station apparatus, a downlink control information format (hereinafter also referred to as a DCI format, an Uplink grant or an Uplink assignment) for the uplink to provide an instruction of the transmission of the A-SRS (non-patent document 3).

PRIOR ART DOCUMENT

Non-Patent Document

[Non-patent document 1] "Carrier aggregation in LTE-Advanced", 3GPP TSG RAN WG1 Meeting #53bis, R1-082468, Jun. 30-Jul. 4, 2008.

[Non-patent document 2] "Aperiodic SRS for LTE-A", 3GPP TSG RAN WG1 Meeting #60bis,R1-102114, Apr. 12-16, 2010.

[Non-patent document 3] "Further Details on SRS for Release 10", 3GPP TSG RAN WG1 Meeting #60bis, R1-101746, Apr. 12-16, 2010.

DISCLOSURE OF THE INVENTION

However, in the conventional technology, when the base station apparatus notifies a plurality of downlink control formats (hereinafter, DCI formats) to the mobile station apparatus, the transmission method for transmitting the A-SRS to the base station apparatus is not clarified.

In other words, when the base station apparatus notifies a plurality of DCI formats to the mobile station apparatus, since the mobile station apparatus does not find out how the A-SRS is transmitted, the base station apparatus cannot perform efficient scheduling.

The present invention is made in view of the foregoing conditions and provides a mobile communication system, a base station apparatus, a mobile station apparatus and a communication method in which efficient scheduling can be performed by the base station apparatus based on the A-SRS transmitted from the mobile station apparatus.

(1) To achieve the above object, the present invention performs the following means. Specifically, according to the present invention, there is provided a mobile communication system in which a mobile station apparatus transmits a sounding reference signal to a base station apparatus, in which the base station apparatus includes information for requesting transmission of the sounding reference signal in a first downlink control information format or a second downlink control information format, and transmits the information to the mobile station apparatus, the mobile station apparatus transmits, based on detection of the information, the sounding reference signal to the base station apparatus, and a first parameter used for the transmission of the sounding reference signal based on the detection of the information included in the first downlink control information format and a second parameter used for the transmission of the sounding reference signal based on the detection of the information included in the second downlink control information format are individually set by a signal of a higher layer transmitted from the base station apparatus.

(2) The first downlink control information format is used for scheduling of a physical downlink shared channel.

(3) The second downlink control information format is used for scheduling of a physical uplink shared channel transmitted through a single antenna port.

(4) The second downlink control information format is used for scheduling of a physical uplink shared channel transmitted through a plurality of antenna ports.

(5) The base station apparatus includes a third parameter for setting periodic transmission of the sounding reference signal in the signal of the higher layer, and transmits the third parameter to the mobile station apparatus, and the mobile station apparatus periodically transmits, according to the third parameter, the sounding reference signal to the base station apparatus.

(6) The first parameter, the second parameter and the third parameter include information on a transmission bandwidth used when the mobile station apparatus transmits the sounding reference signal.

(7) The first parameter, the second parameter and the third parameter include information on a cyclic shift used when the mobile station apparatus transmits the sounding reference signal.

(8) The first parameter, the second parameter and the third parameter include information on an antenna port used when the mobile station apparatus transmits the sounding reference signal.

(9) There is provided a base station apparatus receiving a sounding reference signal from a mobile station apparatus, the base station apparatus including: a unit which includes information for requesting transmission of the sounding reference signal in a first downlink control information format or a second downlink control information format, and which transmits the information to the mobile station apparatus; and a unit which receives, based on detection of the information by the mobile station apparatus, the sounding reference signal from the mobile station apparatus, where a first parameter used for the transmission of the sounding reference signal based on the detection of the information included in the first downlink control information format and a second parameter used for the transmission of the sounding reference signal based on the detection of the information included in the second downlink control information format are individually set by a signal of a higher layer transmitted to the mobile station apparatus.

(10) The base station apparatus further includes: a unit which includes a third parameter for setting periodic transmission of the sounding reference signal in the signal of the higher layer, and which transmits the third parameter to the mobile station apparatus; and a unit which periodically receives, according to the third parameter, the sounding reference signal from the mobile station apparatus.

(11) There is provided a mobile station apparatus transmitting a sounding reference signal to a base station apparatus, the mobile station apparatus including: a unit which receives, from the base station apparatus, a first downlink control information format or a second downlink control information format including information for requesting transmission of the sounding reference signal; and a unit which transmits, based on detection of the information, the sounding reference signal to the base station apparatus, where a first parameter used for the transmission of the sounding reference signal based on the detection of the information included in the first downlink control information format and a second parameter used for the transmission of the sounding reference signal based on the detection of the information included in the second downlink control information format are individually set by a signal of a higher layer transmitted from the base station apparatus.

(12) The mobile station apparatus further includes: a unit which receives, from the base station apparatus, the signal of the higher layer including a third parameter for setting periodic transmission of the sounding reference signal, and a unit which periodically transmits, according to the third parameter, the sounding reference signal to the base station apparatus.

(13) There is provided a communication method of a base station apparatus receiving a sounding reference signal from a mobile station apparatus, the communication method including the steps of: including information for requesting transmission of the sounding reference signal in a first downlink control information format or a second downlink control information format, and transmitting the information to the mobile station apparatus; receiving, based on detection of the information by the mobile station apparatus, the sounding reference signal from the mobile station apparatus; and individually setting, by a signal of a higher layer transmitted to the mobile station apparatus, a first parameter used for the transmission of the sounding reference signal based on the detection of the information included in the first downlink control information format and a second parameter used for the transmission of the sounding reference signal based on the detection of the information included in the second downlink control information format.

(14) The communication method further includes the steps of: including a third parameter for setting periodic transmission of the sounding reference signal in the signal of the higher layer, and transmitting the third parameter to the mobile station apparatus; and periodically receiving, according to the third parameter, the sounding reference signal from the mobile station apparatus.

(15) There is provided a communication method of a mobile station apparatus transmitting a sounding reference signal to a base station apparatus, the communication method including the steps of: receiving, from the base station apparatus, a first downlink control information format or a second downlink control information format including information for requesting transmission of the sounding reference signal; transmitting, based on detection of the information, the sounding reference signal to the base station apparatus; and individually setting, by a signal of a higher layer transmitted from the base station apparatus, a first parameter used for the transmission of the sounding reference signal based on the detection of the information included in the first downlink control information format and a second parameter used for the transmission of the sounding reference signal based on the detection of the information included in the second downlink control information format.

(16) The communication method further includes the steps of: receiving, from the base station apparatus, the signal of the higher layer including a third parameter for setting periodic transmission of the sounding reference signal, and periodically transmitting, according to the third parameter, the sounding reference signal to the base station apparatus.

According to the present invention, efficient scheduling can be performed by the base station apparatus based on the A-SRS transmitted from the mobile station apparatus

BRIEF DESCRIPTION OF THE DRAWINGS

FIG. 9 is a diagram showing an example of asymmetric frequency band aggregation in the conventional technology.

BEST MODES FOR CARRYING OUT THE INVENTION

Figure 1:
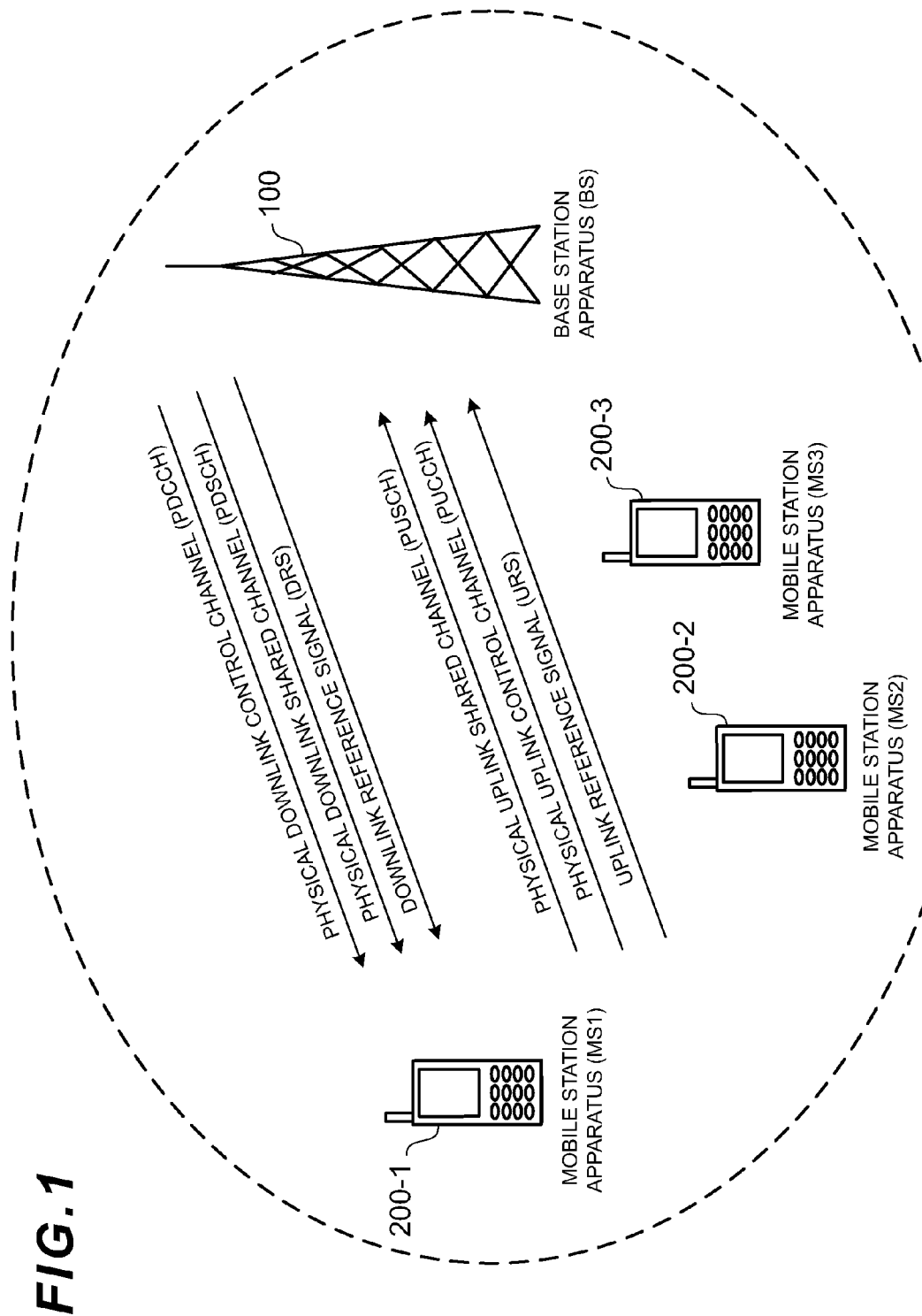
FIG. 1 is a diagram conceptually showing a configuration of a physical channel according to an embodiment of the present invention.

An embodiment of the present invention will now be described with reference to accompanying drawings. FIG. 1 is a diagram showing an example of a configuration of channels according to the embodiment of the present invention. Downlink physical channels are formed with a physical downlink control channel (PUCCH: Physical Downlink Control Channel) and a physical downlink shared channel (PD-SCH: Physical Downlink Shared Channel). Uplink physical channels are formed with a physical uplink shared channel (PUSCH: Physical Uplink Shared Channel) and a physical uplink control channel (PUCCH: Physical Uplink Control Channel).

A base station apparatus 100 transmits a downlink reference signal (DRS: Downlink Reference Signal, also referred to as a downlink pilot signal or a downlink pilot channel) to mobile station apparatuses 200-1 to 200-3 (hereinafter, the mobile station apparatuses 200-1 to 200-3 are collectively referred to as the mobile station apparatus 200). The mobile station apparatus 200 transmits an uplink reference signal (URS: Uplink Reference Signal, also referred to as an uplink pilot signal or an uplink pilot channel) to the base station apparatus 100. Here, the uplink reference signal includes a demodulation reference signal (DRS: Demodulation Reference Signal) used by the base station apparatus 100 to mainly demodulate the PUCCH and/or the PUSCH. The uplink reference signal includes a sounding reference signal (SRS: Sounding Reference Signal) used by the base station apparatus 100 to mainly estimate the channel state of the uplink.

The PDCCH is a channel that is used to notify (specify) the resource allocation of the PDSCH, HARQ processing information for the downlink data, the resource allocation of the PUSCH and the like to the mobile station apparatus 200. The PDCCH is formed with a plurality of control channel elements (CCE: Control Channel Element); the mobile station apparatus 200 detects the PDCCH formed with the CCE to receive the PDCCH from the base station apparatus 100. The CCE is formed with a plurality of resource element groups (REG: Resource Element Group, also referred to as a mini-CCE) dispersed over frequency and time domains. Here, the resource element is a unit resource that is formed with 1 OFDM symbols (time component) and 1 subcarrier (frequency component).

For downlink control information (DCI: Downlink Control Information) transmitted on the PDCCH, a plurality of formats are defined. Hereinafter, the format of the downlink control information is also referred to as a DCI format.

For example, as the DCI format for the downlink, a DCI format 1/a DCI format 1A used when the base station apparatus 100 uses one transmission antenna port or a plurality of transmission antenna ports to transmit the PDSCH in a transmission diversity method is defined. For example, as a DCI format for the downlink, a DCI format 2 used when the base station apparatus 100 transmits the PDSCH in SM (Spatial Multiplexing) utilizing MIMO (Multiple Input Multiple Output) is defined. Here, the DCI format can define a plurality of DCI formats having the same number of bits and a plurality of DCI formats having different numbers of bits.

For example, as a DCI format for the uplink, a DCI format 0 used when the mobile station apparatus 200 transmits the PUSCH through one transmission antenna port is defined. For example, as a DCI format for uplink scheduling, a DCI format OA used when the mobile station apparatus 200 transmits the PUSCH in the SM utilizing the MIMO is prepared.

For example, as a DCI format, a DCI format used for group scheduling on a plurality of mobile station apparatuses 200 is defined. For example, as a DCI format, a DCI format 3/a DCI format 3A including a plurality of TPC commands (Transmission Power Control Command) for a plurality of mobile station apparatuses 200 is defined. For example, the base station apparatus 100 notifies an identifier and one index to the mobile station apparatus 200, and the mobile station apparatus 200 recognizes, as the TPC command for the apparatus, the TPC command corresponding to the index included in the DCI format 3/the DCI format 3A identified by the identifier notified from the base station apparatus 100.

Here, in order to identify whether the TPC command notified to the mobile station apparatus 200 using the DCI format 3/the DCI format 3A is a TPC command for the PUCCH or a command for the PUSCH (which may be the PUSCH and the SRS), the base station apparatus 100 can notify two identifiers to the mobile station apparatus 200. In other words, the base station apparatus 100 can notify one index for each of the two identifiers to the mobile station apparatus 200. Here, among the two identifiers notified by the base station apparatus 100, an identifier performed on the DCI format including the TPC command for the PUCCH is also referred to as a TPC-PUCCH-RNTI. An identifier performed on the DCI format including the TPC command for the PUSCH (which may be the PUSCH and the SRS) is also referred to as a TPC-PUSCH-RNTI.

Since the DCI format 3/the DCI format 3A used for group scheduling on a plurality of mobile station apparatuses 200 needs to be received (detected) by a plurality of mobile station apparatuses 200, the DCI format 3/the DCI format 3A is arranged in a common search space (also referred to as a CSS: Common Search Space) where all the mobile station apparatuses 200 try to perform search (detection) on the PDCCH. Here, a PDCCH for a (specified) mobile station apparatus 200 is arranged in a mobile station apparatus specific search space (USS: User equipment specific Search Space, also referred to as a UE specific Search Space) where the (specified) mobile station apparatus 200 tries to perform search (detection) on the PDCCH.

The base station apparatus 100 transmits a cyclic redundancy check (CRC: Cyclic Redundancy Check) code generated based on the DCI to the mobile station apparatus 200 by giving a sequence scrambled by RNTI (Radio Network Temporary Identity) to the DCI. The mobile station apparatus 200 changes the interpretation of the DCI according to by which RNTI the cyclic redundancy check code is scrambled. For example, when, in the DCI, the cyclic redundancy check code is scrambled by C-RNTI (Cell-Radio Network Temporary Identity) allocated from the base station apparatus 100, the mobile station apparatus 200 determines that the DCI is a DCI for the apparatus.

The PDCCH is coded separately (Separate Coding) for each of the mobile station apparatuses 200 and for each of types. Specifically, the mobile station apparatus 200 detects a plurality of PDCCHs to acquire the resource allocation in the downlink, the resource allocation in the uplink and other control information. The value of the CRC (cyclic redundancy check) is given to each of the PDCCHs; the mobile station apparatus 200 performs the CRC on each of the sets of CCEs that can constitute the PDCCH, and the PDCCH on which the CRC has been successfully performed is acquired as the PDCCH for the apparatus. This is also referred to as blind decoding; the range of the sets of the CCEs that can constitute the PDCCH on which the blind decoding is performed is referred to as a search space (Search Space). That is, the mobile station apparatus 200 performs the blind decoding on the CCEs within the search space to detect the PDCCH for the apparatus.

When the resource allocation of the PDSCH is transmitted on the PDCCH for the mobile station apparatus 200, the mobile station apparatus 200 receives, according to the resource allocation transmitted on the PDCCH from the base station apparatus 100, with the PDSCH, a downlink signal (downlink data (transport block for downlink shared channel (DL-SCH)) and/or downlink control data (downlink control information) and/or the downlink reference signal (DRS)). In other words, the PDCCH can be used for transmitting a signal (hereinafter also referred to as a "downlink transmission permission signal" or a "downlink grant") for performing the resource allocation on the downlink.

Moreover, when the resource allocation of the PUSCH is transmitted on the PDCCH for the mobile station apparatus 200, the mobile station apparatus 200 transmits, according to the resource allocation transmitted on the PDCCH from the base station apparatus 100, with the PUSCH, an uplink signal (uplink data (transport block for uplink shared channel (UL-SCH)) and/or uplink control data (uplink control information) and/or uplink reference signal (URS)). In other words, the PDCCH can be used for transmitting a signal (also referred to as an "uplink transmission permission signal" or an "uplink grant") for allowing the data transmission for the uplink.

The PDSCH is a channel that is used for transmitting the downlink data (transport block for the downlink shared channel (DL-SCH)) or paging information (paging channel: PCH). The base station apparatus 100 uses the PUSCH allocated by the PDCCH to transmit the downlink transport block (transport block for the downlink shared channel (DL-SCH)) to the mobile station apparatus 200.

Here, the downlink data indicates, for example, user data; the DL-SCH is a transport channel. In the DL-SCH, the HARQ and dynamic adaptation radio link control are supported, and beam forming is available. In the DL-SCH, dynamic resource allocation and quasi-static resource allocation are supported.

The PUSCH is a channel that is used for mainly transmitting the uplink data (transport block for the uplink shared channel (UL-SCH)). The mobile station apparatus 200 uses the PUSCH allocated by the PDCCH transmitted from the base station apparatus 100 to transmit the uplink transport block (transport block for the uplink shared channel (UL-SCH)) to the base station apparatus 100. When the base station apparatus 100 schedules the mobile station apparatus 200, the uplink control information (UCI) is also transmitted using the PUSCH.

Here, the uplink data indicates, for example, user data; the UL-SCH is a transport channel. The PUSCH is a physical channel that is defined (formed) by the time domain and the frequency domain. In the UL-SCH, the HARQ and the dynamic adaptation radio link control are supported, and the beam forming is available. In the UL-SCH, dynamic resource allocation and quasi-static resource allocation are supported.

Here, a radio resource control signal (hereinafter referred to as "RRC signaling: Radio Resource Control Signaling") exchanged between the base station apparatus 100 and the mobile station apparatus 200 may be included in the uplink data (UL-SCH) and the downlink data (DL-SCH). A MAC (medium access control) control element exchanged between the base station apparatus 100 and the mobile station apparatus 200 may be included in the uplink data (UL-SCH) and the downlink data (DL-SCH).

The base station apparatus 100 and the mobile station apparatus 200 transmit and receive the RRC signaling in a higher layer ((Radio Resource Control) layer). The base station apparatus 100 and the mobile station apparatus 200 also transmit and receive the MAC control element in a higher layer (medium access control (MAC: Medium Access Control) layer).

The PUCCH is a channel that is used for transmitting the uplink control information (UCI). Here, the uplink control information includes the channel state information (CSI), the channel quality identifier (CQI), the precoding matrix identifier (PMI) and the rank identifier (RI). The information indicating the ACK/NACK of the HARQ for the downlink transport block is included in the uplink control information. The scheduling request for requesting resource allocation (requesting transmission in the UL-SCH) for the transmission of the uplink data by the mobile station apparatus 200 is included in the uplink control information.

[Configuration of the Base Station Apparatus 100]

Figure 2:
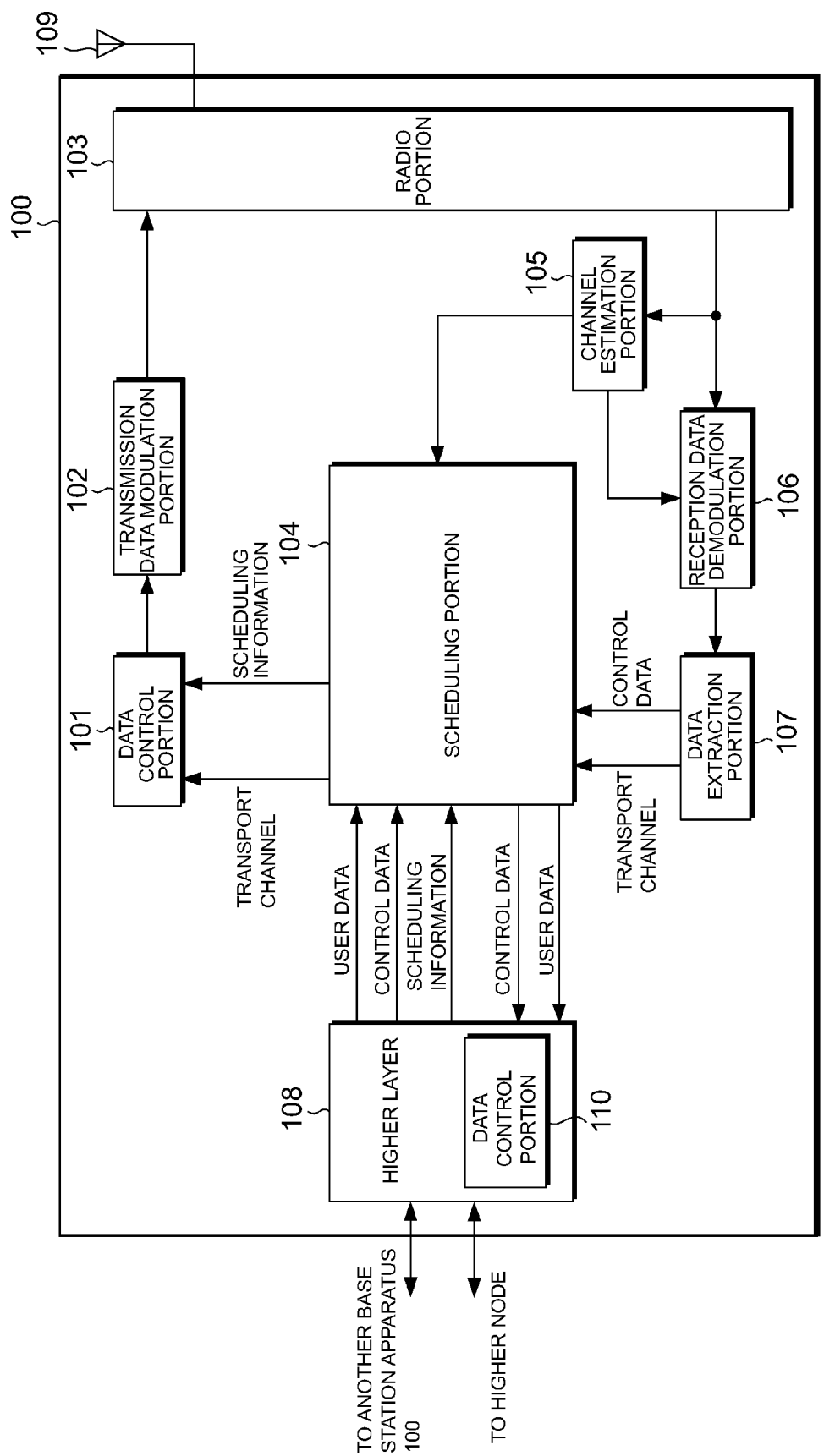
FIG. 2 is a block diagram showing a schematic configuration of a base station apparatus according to the embodiment of the present invention.

FIG. 2 is a block diagram showing the schematic configuration of the base station apparatus 100 according to the embodiment of the present invention. The base station apparatus 100 is configured to include a data control portion 101, a transmission data modulation portion 102, a radio portion 103, a scheduling portion 104, a channel estimation portion 105, a reception data demodulation portion 106, a data extraction portion 107, an higher layer 108 and an antenna 109. The radio portion 103, the scheduling portion 104, the channel estimation portion 105, the reception data demodulation portion 106, the data extraction portion 107, the higher layer 108 and the antenna 109 constitute a base station side reception portion; the data control portion 101, the transmission data modulation portion 102, the radio portion 103, the scheduling portion 104, the higher layer 108 and the antenna 109 constitute a base station apparatus side transmission portion.

The antenna 109, the radio portion 103, the channel estimation portion 105, the reception data demodulation portion 106 and the data extraction portion 107 perform processing on uplink physical layers. The antenna 109, the radio portion 103, the transmission data modulation portion 102 and the data control portion 101 perform processing on downlink physical layers.

The data control portion 101 receives the transport channel from the scheduling portion 104. The data control portion 101 maps, onto the physical channel, the transport channel and a signal and a channel generated in the physical layer based on the scheduling information input from the scheduling portion 104. The individual pieces of data mapped as described above are output to the transmission data modulation portion 102.

The transmission data modulation portion 102 modulates transmission data into an OFDM scheme. Based on the scheduling information from the scheduling portion 104 and a modulation scheme and a coding scheme corresponding to each PRB, the transmission data modulation portion 102 performs, on the data input from the data control portion 101, signal processing such as data modulation, coding, series/parallel transform for an input signal, IFFT (Inverse Fast Fourier Transform) processing, CP (Cyclic Prefix) insertion and filtering, generates transmission data and outputs it to the radio portion 103. Here, the scheduling information includes downlink physical resource block PRB (Physical Resource Block) allocation information and physical resource block position information formed with, for example, a frequency and a time; the modulation scheme and the coding scheme corresponding to each PRB includes information such as a modulation scheme: 16 QAM and a coding rate: 2/3 coding rate.

The radio portion 103 upconverts modulation data input from the transmission data modulation portion 102 into a radio frequency to generate a radio signal, and transmits it through the antenna 109 to the mobile station apparatus 200. The radio portion 103 receives, through the antenna 109, an uplink radio signal from the mobile station apparatus 200, downconverts it into a baseband signal and outputs the reception data to the channel estimation portion 105 and the reception data demodulation portion 106.

The scheduling portion 104 performs processing on the medium access control (MAC: Medium Access Control) layer. The scheduling portion 104 performs mapping on a logical channel and the transport channel, scheduling (such as the HARQ processing and the selection of the transport format) on the uplink and the downlink and the like. In the scheduling portion 104, in order to integrate and control the processing portion of each physical layer, there are interfaces between the scheduling portion 104 and the antenna 109, the radio portion 103, the channel estimation portion 105, the reception data demodulation portion 106, the data control portion 101, the transmission data modulation portion 102 and the data extraction portion 107 (not shown).

In the downlink scheduling, based on the uplink signals (such as the CSI, the CQI, the PMI and the RI, the information indicating the ACK/NACK for the downlink transport block, the scheduling request and the reference signal) received from the mobile station apparatus 200, information on the PRB that can be used by each mobile station apparatus 200, buffer conditions, the scheduling information input from the higher layer 108 and the like, the scheduling portion 104 performs processing for selecting the downlink transport format (transmission form, that is, the allocation of the physical resource blocks, the modulation scheme, the coding scheme and the like) for modulating each piece of data, retransmission control on the HARQ and the generation of the scheduling information used in the downlink. The scheduling information used for the scheduling of the downlink is output to the data control portion 101.

In the uplink scheduling, based on the result of the estimation of the channel state (radio channel state) of the uplink output by the channel estimation portion 105, a resource allocation request from the mobile station apparatus 200, information on the PRB that can be used by each mobile station apparatus 200, the scheduling information input from the higher layer 108 and the like, the scheduling portion 104 performs processing for selecting the uplink transport format (transmission form, that is, the allocation of the physical resource blocks, the modulation scheme, the coding scheme and the like) for modulating each piece of data and the generation of the scheduling information used for the scheduling of the uplink. The scheduling information used for the scheduling of the uplink is output to the data control portion 101.

Further, the scheduling portion 104 also maps the downlink logical channel input from the higher layer 108 onto the transport channel, and outputs it to the data control portion 101. The scheduling portion 104 also processes, as necessary, the control data and the transport channel acquired in the uplink input from the data extraction portion 107, thereafter maps them onto the uplink logical channel and outputs them to the higher layer 108.

In order to demodulate the uplink data, the channel estimation portion 105 estimates the channel state of the uplink from a demodulation reference signal (DRS: Demodulation Reference Signal), and outputs the result of the estimation to the reception data demodulation portion 106. In order to perform the scheduling of the uplink, the channel estimation portion 105 also estimates the channel state of the uplink from a sounding reference signal (SRS: Sounding Reference Signal), and outputs the result of the estimation to the scheduling portion 104.

The reception data demodulation portion 106 also serves as an OFDM demodulation portion and/or a DFT-Spread-OFDM (DFT-S-OFDM) demodulation portion that demodulates the reception data modulated into the OFDM scheme and/or the SC-FDMA scheme. Based on the result of the estimation of the channel state of the uplink input from the channel estimation portion 105, the reception data demodulation portion 106 performs, on the modulation data input from the radio portion 103, signal processing such as DFT transform, subcarrier mapping, IFFT transform and filtering, performs demodulation processing on it and outputs it to the data extraction portion 107.

The data extraction portion 107 checks whether or not the data input from the reception data demodulation portion 106 is correct, and outputs the result of the checking (ACK or NACK) to the scheduling portion 104. The data extraction portion 107 demultiplexes the data input from the reception data demodulation portion 106 into the transport channel and the control data on the physical layer, and outputs them to the scheduling portion 104. The demultiplexed control data includes the CSI, the CQI, the PMI and the RI transmitted from the mobile station apparatus 200, the information indicting the ACK/NACK for the downlink transport block, the scheduling request and the like.

The higher layer 108 performs processing on a packet data convergence protocol (PDCP: Packet Data Convergence Protocol) layer, a radio link control (RLC: Radio Link Control) layer and a radio resource control (RRC: Radio Resource Control) layer. In the higher layer 108, in order to integrate and control the processing portion of a lower layer, there are interfaces between the higher layer 108 and the scheduling portion 104, the antenna 109, the radio portion 103, the channel estimation portion 105, the reception data demodulation portion 106, the data control portion 101, the transmission data modulation portion 102 and the data extraction portion 107 (not shown).

The higher layer 108 includes the radio resource control portion 110 (also called the control portion). The radio resource control portion 110 performs management on various types of setting information, management on system information, paging control, management on the communication state of each mobile station apparatus 200, management on the transfer of a handover or the like, management on the buffer conditions of each mobile station apparatus 200, management on the connection setting of a unicast- and a multicast bearer, management on a mobile station apparatus identifier (UEID) and the like. The higher layer 108 exchanges information with another base station apparatus 100 and information with the higher node.

[Configuration of the Mobile Station Apparatus 200]

Figure 3:
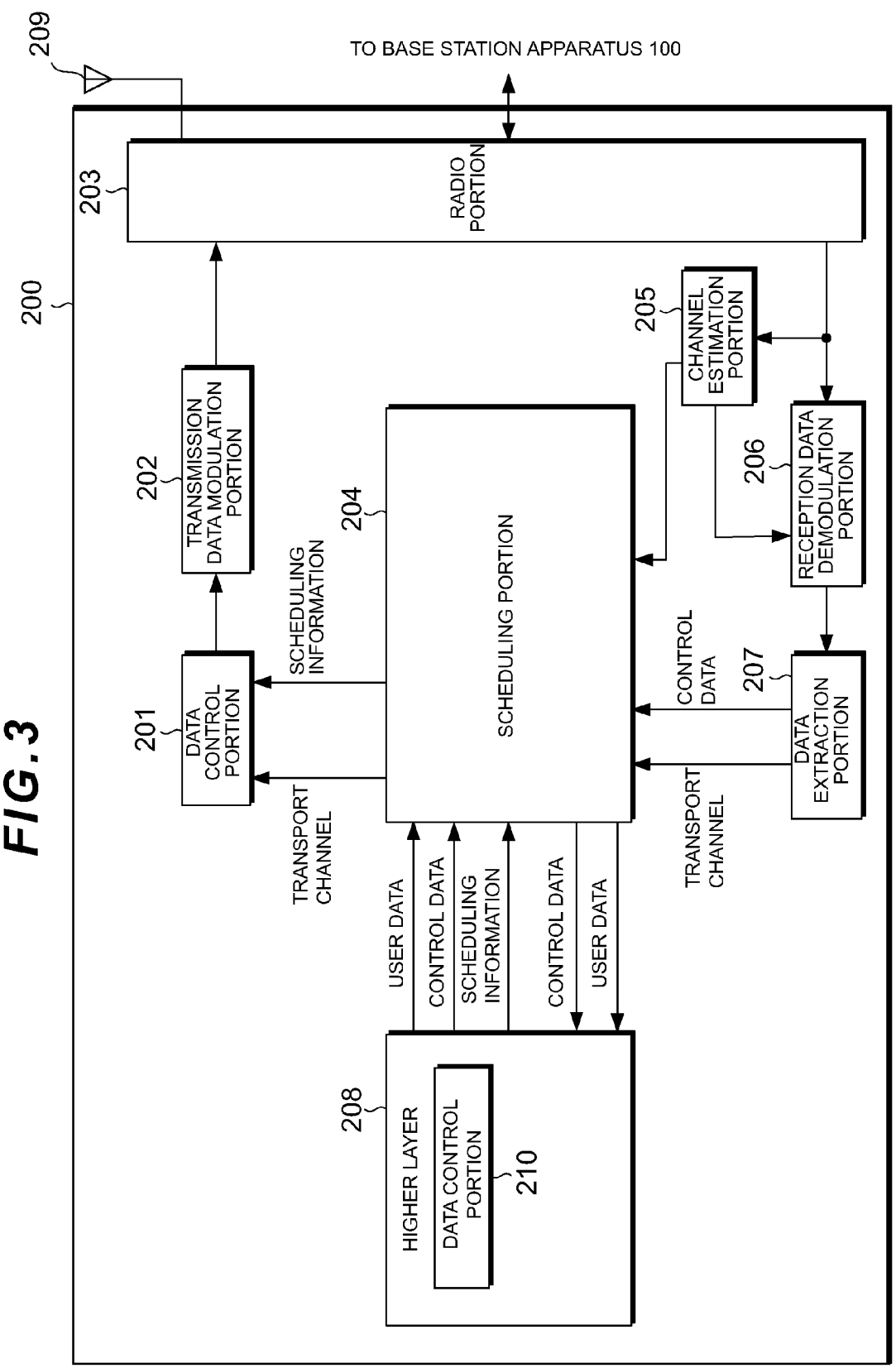
FIG. 3 is a block diagram showing a schematic configuration of a mobile station apparatus according to the embodiment of the present invention.

FIG. 3 is a block diagram showing the schematic configuration of the mobile station apparatus 200 according to the embodiment of the present invention. The mobile station apparatus 200 is configured to include a data control portion 201, a transmission data modulation portion 202, a radio portion 203, a scheduling portion 204, a channel estimation portion 205, a reception data demodulation portion 206, a data extraction portion 207, a higher layer 208 and an antenna 209. The data control portion 201, the transmission data modulation portion 202, the radio portion 203, the scheduling portion 204, the higher layer 208 and the antenna 209 constitute a mobile station side transmission portion; the radio portion 203, the scheduling portion 204, the channel estimation portion 205, the reception data demodulation portion 206, the data extraction portion 207, the higher layer 208 and the antenna 209 constitute a mobile station side reception portion.

The data control portion 201, the transmission data modulation portion 202 and the radio portion 203 perform processing on the uplink physical layer. The radio portion 203, the channel estimation portion 205, the reception data demodulation portion 206 and the data extraction portion 207 perform processing on the downlink physical layer.

The data control portion 201 receives the transport channel from the scheduling portion 204. The transport channel and the signal and the channel generated in the physical layer are mapped onto the physical channel based on the scheduling information input from the scheduling portion 204. The individual pieces of data mapped as described above are output to the transmission data modulation portion 202.

The transmission data modulation portion 202 modulates transmission data into the OFDM scheme and/or the SC-FDMA scheme. The transmission data modulation portion 202 performs, on the data input from the data control portion 201, signal processing such as data modulation, DFT (Discrete Fourier Transform) processing, subcarrier mapping, IFFT (Inverse Fast Fourier Transform) processing, CP insertion and filtering, generates transmission data and outputs it to the radio portion 203.

The radio portion 203 upconverts modulation data input from the transmission data modulation portion 202 into a radio frequency to generate a radio signal, and transmits it through the antenna 209 to the base station apparatus 100. The radio portion 203 receives, through the antenna 209, the radio signal modulated by the downlink data from the base station apparatus 100, downconverts it into a baseband signal and outputs the reception data to the channel estimation portion 205 and the reception data demodulation portion 206.

The scheduling portion 204 performs processing on the medium access control (MAC: Medium Access Control) layer. The scheduling portion 204 performs mapping on the logical channel and the transport channel, scheduling (such as the HARQ processing and the selection of the transport format) on the downlink and the uplink and the like. In the scheduling portion 204, in order to integrate and control the processing portion of each physical layer, there are interfaces between the scheduling portion 204 and the antenna 209, the data control portion 201, the transmission data modulation portion 202, the channel estimation portion 205, the reception data demodulation portion 206, the data extraction portion 207 and the radio portion 203 (not shown).

In the downlink scheduling, based on the scheduling information (the transport format and the HARQ retransmission information) from the base station apparatus 100 and the higher layer 208 and the like, the scheduling portion 204 performs reception control on the transport channel, the physical signal and the physical channel and generates the scheduling information used in the HARQ retransmission control and the scheduling of the downlink. The scheduling information used in the scheduling of the downlink is output to the data control portion 201.

In the uplink scheduling, based on buffer conditions in the uplink input from the higher layer 208, the scheduling information (such as the transport format and the HARQ retransmission information) for the uplink from the base station apparatus 100 input from the data extraction portion 207, the scheduling information input from the higher layer 208 and the like, the scheduling portion 204 performs scheduling processing for mapping the uplink logic channel input from the higher layer 208 onto the transport channel and generates the scheduling information used in the scheduling of the uplink.

For the uplink transport format, information notified from the base station apparatus 100 is utilized. The scheduling information described above is output to the data control portion 201.

The scheduling portion 204 also maps the uplink logic channel input from the higher layer 208 onto the transport channel, and outputs it to the data control portion 201. The scheduling portion 204 also outputs, to the data control portion 201, the CSI, the CQI, the PMI and the RI input from the channel estimation portion 205 and the result of the confirmation of the CRC check input from the data extraction portion 207. The scheduling portion 204 also processes, as necessary, the control data input from the data extraction portion 207 and acquired in the downlink and the transport channel, thereafter maps them onto the downlink logic channel and outputs them to the higher layer 208.

In order to demodulate the downlink data, the channel estimation portion 205 estimates the channel state of the downlink from the demodulation reference signal, and outputs the result of the estimation to the reception data demodulation portion 206. In order to notify the base station apparatus 100 of the result of the estimation of the channel state (radio channel state, the CSI, the CQI, the PMI and the RI) of the downlink, the channel estimation portion 205 estimates the channel state of the downlink from the downlink reference signal, and outputs the result of the estimation to the scheduling portion 204 as, for example, the CSI, the CQI, the PMI and the RI.

The reception data demodulation portion 206 demodulates the reception data modulated into the OFDM scheme. The reception data demodulation portion 206 performs, based on the result of the estimation of the channel state of the downlink input from the channel estimation portion 205, the demodulation processing on the modulation data input from the radio portion 203, and outputs it to the data extraction portion 207.

The data extraction portion 207 performs the CRC check on the data input from the reception data demodulation portion 206 to check whether or not the data is correct, and outputs the result of the checking (information indicating the ACK or NACK) to the scheduling portion 204. The data extraction portion 207 demultiplexes the data input from the reception data demodulation portion 206 into the transport channel and the control data on the physical layer, and outputs them to the scheduling portion 204. The demultiplexed control data includes the scheduling information such as the resource allocation of the downlink and the uplink and the uplink HARQ control information.

The higher layer 208 performs processing on the packet data convergence protocol (PDCP: Packet Data Convergence Protocol) layer, the radio link control (RLC: Radio Link Control) layer and the radio resource control (RRC: Radio Resource Control) layer. In the higher layer 208, in order to integrate and control the processing portion of the lower layer, there are interfaces between the higher layer 208 and the scheduling portion 204, the antenna 209, the data control portion 201, the transmission data modulation portion 202, the channel estimation portion 205, the reception data demodulation portion 206, the data extraction portion 207 and the radio portion 203 (not shown).

The higher layer 208 includes the radio resource control portion 210 (also called the control portion). The radio resource control portion 210 performs management on various types of setting information, management on system information, paging control, management on the communication state of the station, management on the transfer of a handover or the like, management on the buffer conditions, management on the connection setting of the unicast- and the multicast bearer and management on the mobile station apparatus identifier (UEID).

First Embodiment

Next, a first embodiment of a mobile communication system using the base station apparatus 100 and the mobile station apparatus 200 will now be described. In the first embodiment, the base station apparatus 100 notifies, in the same subframe, the mobile station apparatus 200 of a plurality of DCI formats including at least one DCI format including the instruction of the transmission of the SRS, and the mobile station apparatus 200 transmits, when a predetermined DCI format among the plurality of DCI formats includes the instruction of the transmission of the SRS, the SRS to the base station apparatus 100.

The base station apparatus 100 notifies, in the same subframe, the mobile station apparatus 200 of a plurality of DCI formats, and the mobile station apparatus 200 transmits, when all the plurality of DIC formats include the instruction of the transmission of the SRS, the SRS to the base station apparatus 100.

Here, the mobile station apparatus 200 can transmit the SRS to the base station apparatus 100 in a subframe (for example, a subframe four subframes later) a predetermined number of frames after the subframe in which the plurality of DCI formats are notified from the base station apparatus 100. The base station apparatus 100 can set the subframe in which the mobile station apparatus 200 transmits the SRS to the base station apparatus 100, to the mobile station apparatus 200, specific for the cell. The base station apparatus 100 can set the subframe in which the mobile station apparatus 200 transmits the SRS to the base station apparatus 100, to the mobile station apparatus 200, specific for the mobile station apparatus. The mobile station apparatus 200 can transmit the SRS to the base station apparatus 100 in the subframe set from the base station apparatus 100.

The base station apparatus 100 can map the DCI format including an instruction of the transmission of the SRS in a mobile station apparatus specific search region (USS: UE specific Search Space). The base station apparatus 100 includes information on the downlink scheduling in the DCI format mapped in the USS and including the instruction of the transmission of the SRS, and can notify the mobile station apparatus 200 of the information. The base station apparatus 100 also includes information on the uplink scheduling in the DCI format mapped in the USS and including the instruction of the transmission of the SRS, and can notify the mobile station apparatus 200 of the information.

Further, the base station apparatus 100 can map the DCI format including the instruction of the transmission of the SRS in the common search region (CSS: Common Search Space).

Although, in the following description of the present embodiment, the frequency band is defined by a bandwidth (Hz), it may be defined by the number of resource blocks (RB) formed with the frequency and the time. In other words, the bandwidth may be defined by the number of resource blocks. The bandwidth and the number of resource blocks can also be defined by the number of subcarriers.

The component carrier in the present embodiment refers to a (narrow) frequency band used compositely when the base station apparatus 100 and the mobile station apparatus 200 perform communication in the mobile communication system having a (wider) frequency band (which may be a system band). The base station apparatus 100 and the mobile station apparatus 200 aggregate a plurality of component carriers (for example, five frequency bands having a bandwidth of 20 MHz), and thereby forms a (wider) frequency band (for example, a frequency band having a bandwidth of 100 MHz); they compositely use these component carriers, and thereby can realize high-speed data communication (the transmission and reception of information).

The component carrier refers to each of (narrow) frequency bands (for example, a frequency band having a bandwidth of 20 MHz) that constitute this (wider) frequency band (for example, a frequency band having a bandwidth of 100 MHz). The component carrier may refer to the (center) carrier frequency of each of the (narrow) frequency bands.

Specifically, the downlink component carrier has a band (width) in a frequency band that can be used when the base station apparatus 100 and the mobile station apparatus 200 transmit and receive information in the downlink; the uplink component carrier has a band (width) in a frequency band that can be used when the base station apparatus 100 and the mobile station apparatus 200 transmit and receive information in the uplink. Furthermore, the component carrier may be defined as a unit in which a certain specific physical channel (for example, the PDCCH, the PUCCH or the like) is formed.

Further, the component carrier may be mapped in a contiguous frequency band or a non-contiguous frequency band. The base station apparatus 100 and the mobile station apparatus 200 aggregate a plurality of component carriers that are contiguous and/or non-contiguous frequency bands, and thereby forms a wider frequency band, they compositely use these component carriers, and thereby can realize high-speed data communication (the transmission and reception of information).

Furthermore, the frequency band used for the downlink communication and the frequency band used for the uplink communication formed with the component carriers do not need to have the same bandwidth; the base station apparatus 100 and the mobile station apparatus 200 compositely use the downlink frequency band and the uplink frequency band formed with the component carriers and having different bandwidths, and thereby can perform communication (the above-described asymmetric frequency band aggregation: Asymmetric carrier aggregation).

Figure 4:
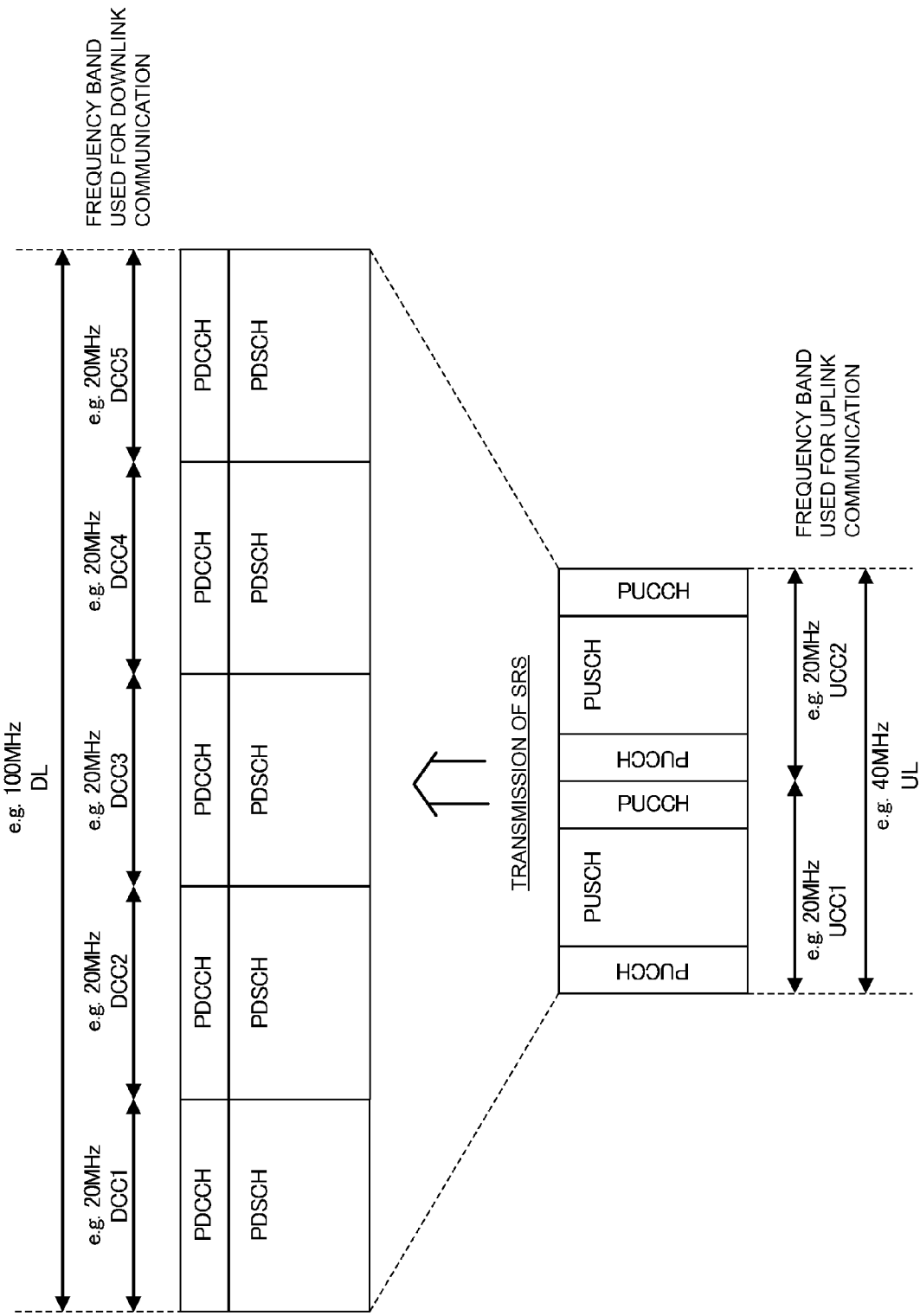
FIG. 4 is a diagram showing an example of a mobile communication system to which the embodiment of the present invention can be applied.

FIG. 4 is a diagram showing an example of the mobile communication system to which the first embodiment can be applied. Although FIG. 4 shows, as an example, a mobile communication system that is shown in FIG. 9 and that is subjected to the asymmetric frequency band aggregation, the first embodiment can be applied to each of a mobile communication system that is subjected to the symmetric frequency band aggregation and a mobile communication system that is subjected to the asymmetric frequency band aggregation.

FIG. 4 shows, as an example, that a frequency band having a bandwidth of 100 MHz and used for the downlink communication, which is composed of five downlink component carriers (DCC1, DCC2, DCC3, DCC4 and DCC5) having a bandwidth of 20 MHz. FIG. 4 also shows that a frequency band having a bandwidth of 40 MHz and used for the uplink communication, which is composed of two uplink component carriers (UCC1 and DCC2) having a bandwidth of 20 MHz.

In FIG. 4, on each of the downlink/uplink component carriers, the downlink/uplink channels are mapped, and the base station apparatus 100 uses the PDCCH to allocate (schedule) the PDSCH to the mobile station apparatus 200 and uses the PDSCH to transmit the downlink transport block to the mobile station apparatus 200. Here, in FIG. 4, the base station apparatus 100 can transmit, at the maximum, up to five downlink transport blocks (which may be the PDSCH) to the mobile station apparatus 200 in the same subframe.

The mobile station apparatus 200 uses the PUSCH and/or the PUSCH to transmit, to the base station apparatus 100, the uplink control information such as the channel state information, the information indicating the ACK/NACK of the HARQ for the downlink transport block, and the scheduling request. The mobile station apparatus 200 also uses the PUSCH allocated (scheduled) by the PDCCH from the base station apparatus 100, and thereby can transmit the uplink transport block to the base station apparatus 100. Here, in FIG. 4, the mobile station apparatus 200 can transmit, at the maximum, up to two uplink transport blocks (which may be the PUSCH) to the base station apparatus 100 in the same subframe.

In FIG. 4, the base station apparatus 100 can provide the instruction of the transmission of a periodic SRS (P-SRS: Periodic SRS) to the mobile station apparatus 200. For example, the base station apparatus 100 includes, in the RRC signaling transmitted for each mobile station apparatus 200, information indicating an interval (transmission interval) when the mobile station apparatus 200 transmits the P-SRS, and transmits it to the mobile station apparatus 200, and thereby can provide an instruction of the transmission of the P-SRS to the mobile station apparatus 200.

The mobile station apparatus 200, to which the base station apparatus 100 provides the instruction of the transmission of the P-SRS, periodically transmits the P-SRS to the base station apparatus 100. For example, the mobile station apparatus 200 transmits the P-SRS to the base station apparatus 100 based on the interval set by the base station apparatus 100.

Moreover, in FIG. 4, the base station apparatus 100 can provide an instruction of the transmission of an aperiodic SRS (A-SRS: Aperiodic SRS) to the mobile station apparatus 200. For example, the base station apparatus 100 includes the instruction of the transmission of the A-SRS in the downlink control information format (DCI format, which may be transmitted on the PDCCH), and transmits it to the mobile station apparatus 200, and thereby can provide the instruction of the transmission of the A-SRS to the mobile station apparatus 200.

For example, the base station apparatus 100 includes the instruction of the transmission of the A-SRS in the DCI format (downlink grant, also referred to as the downlink assignment) for the downlink, and transmits it to the mobile station apparatus 200, and thereby can provide the instruction of the transmission of the A-SRS to the mobile station apparatus 200. In other words, the base station apparatus 100 uses the DCI format 1/the DCI format 1A (which may be a DCI format similar to the DCI format 1/the DCI format 1A) as described above, and thereby can provide the instruction of the transmission of the A-SRS to the mobile station apparatus 200. The base station apparatus 100 also uses the DCI format 2 (which may be a DCI format similar to the DCI format 2) as described above, and thereby can provide the instruction of the transmission of the A-SRS to the mobile station apparatus 200.

For simplicity, in the following description, the DCI format for the downlink (which may be the DCI format 1/the DCI format 1A, a DCI format similar to the DCI format 1/1A, the DCI format 2 or a DCI format similar to the DCI format 2) is referred to as a DCI format A.

Here, for example, the DCI format A is used when the base station apparatus 100 schedules the PDSCH. In other words, the DCI format A is used when the base station apparatus 100 transmits the PDSCH through one transmission antenna port. The DCI format A is also used when the base station apparatus 100 transmits the PDSCH through a plurality of transmission antenna ports. The DCI format A is also used when the base station apparatus 100 gives an instruction of a random access procedure.

For example, the information transmitted in the DCI format A includes: resource allocation header indicating a resource allocation type (Resource allocation header); resource allocation information for the PDSCH (Resource block assignment); MCS information indicating a modulation scheme and a coding rate (Modulation and Coding Scheme); information indicating the process number of the HARQ (HARQ process number); information for identifying whether or not the transmission data is new (New data indicator); information indicating a parameter for retransmission (Redundancy version); and TPC command information for the PUCCH (TPC command for PUCCH).

Moreover, for example, the information transmitted in the DCI format A includes: information used for differentiation from other DCI formats (Flag for format differentiation); information used for identifying a method of allocating a virtual resource block (Localized/Distributed VRB assignment flag); information used for the instruction of the random access procedure (Preamble index, PRACH Mask Index); and padding bit.

That is, the information field onto which these pieces of information are mapped is defined in the DCI format A. In other words, the DCI format A includes the downlink scheduling information. Here, the DCI format A includes downlink information for a (specific) mobile station apparatus 200. In other words, the DCI format A is mapped by the base station apparatus 100 in the mobile station apparatus specific search region (USS: UE specific Search Space).

The base station apparatus 100 includes the instruction of the transmission of the A-SRS in the DCI format A to transmit it to the mobile station apparatus 200, and thereby can provide the instruction of the transmission of the A-SRS to the mobile station apparatus 200. Here, the instruction of the transmission of the A-SRS can be realized by defining, for example, the information field (for example, an information field of one bit) for the instruction of the transmission of the A-SRS in the DCI format A.

The instruction of the transmission of the A-SRS can also be realized by setting, at a specific value, a specific information field (information) among the information fields (information) included in the DCI format A as described above. For example, the instruction of the transmission of the A-SRS can be realized by setting, at "0", Flag for format differentiation included in the DCI format A and setting, at "1", Localized/Distributed VRB assignment flag. In this case, the remaining information fields (information fields other than the specific information field) included in the DCI format A can also be used by the mobile station apparatus 200 as the information field (information field onto which the A-SRS parameter used when the mobile station apparatus 200 transmits the A-SRS is mapped) for transmitting the A-SRS.

Here, which information field (which information) included in the DCI format A is set at the corresponding value so as to provide the instruction of the transmission of the A-SRS is previously defined in specifications or the like, and can be made known between the base station apparatus 100 and the mobile station apparatus 200. As described above, that a specific information field (information) included in the DCI format is set at a specific value, and is thereby used for a certain application (different from the original application (for example, the downlink scheduling) (for example, it is used for the instruction of the transmission of the A-SRS) is also referred to as the setting of a code point for the DCI format.

The mobile station apparatus 200 recognizes, according to whether the information field previously defined is set at a specific value, whether the DCI format indicates, for example, the downlink scheduling or the transmission of the A-SRS. The mobile station apparatus 200 also changes, based on whether the information field previously defined is set at a specific value, the interpretation of the information field included in the DCI format. For example, the mobile station apparatus 200 can change, when the information field previously defined is set at a specific value, the interpretation of the remaining information fields to the information filed onto which the A-SRS parameter for transmitting the A-SRS is mapped.

In other words, the base station apparatus 100 explicitly includes the instruction of the transmission of the A-SRS in the DCI format A to transmit it to the mobile station apparatus 200 (for example, to transmit information of one bit indicating the transmission of the A-SRS to the mobile station apparatus 200), and thereby can provide the instruction of the transmission of the A-SRS to the mobile station apparatus 200. The base station apparatus 100 also sets, at a specific value, a specific information field included in the DCI format A to transmit the instruction of the transmission of the A-SRS to the mobile station apparatus 200, and thereby can provide the instruction of the transmission of the A-SRS to the mobile station apparatus 200.

For example, the base station apparatus 100 includes the instruction of the transmission of the A-SRS in the DCI format for the uplink (also referred to as the uplink grant or the uplink assignment) to transmit it, and thereby can provide the instruction of the transmission of the A-SRS to the mobile station apparatus 200. In other words, the base station apparatus 100 uses the DCI format 0/the DCI format 0A as described above (which may be a DCI format similar to the DCI format 0/the DCI format 0A), and thereby can transmit the instruction of the transmission of the A-SRS to the mobile station apparatus 200.

For simplicity, in the following description, the DCI format for the uplink (which may be the DCI format 0/the DCI format 0A or a DCI format similar to the DCI format 0/0A) is referred to as a DCI format B.

Here, for example, the DCI format B is used when the base station apparatus 100 schedules the PUSCH. In other words, the DCI format B is used when the mobile station apparatus 200 transmits the PUSCH through one transmission antenna port. The DCI format B is also used when the mobile station apparatus 200 transmits the PUSCH through a plurality of transmission antenna ports.

For example, the information transmitted in the DCI format B includes: information used for differentiation from other DCI formats (Flag for format differentiation); information indicating transmission involving hopping (Hopping flag); resource allocation information for the PUSCH (Resource block assignment), information indicating parameters for a modulation scheme, a coding rate and retransmission (Modulation and Coding Scheme and Redundancy version); information for identifying whether or not the transmission data is new (New data indicator); TPC command (TPC command for scheduled PUSCH) information for the scheduled PUSCH; information indicating a cyclic shift performed on the demodulation reference signal (Cyclic shift for DM RS); transmission request information of the CQI (CQI request); and padding bit.

Specifically, the information field onto which these types of information (information bits) are mapped are defined in the DCI format B. In other words, the uplink scheduling information is included in the DCI format B. Here, the DCI format B includes uplink scheduling information for a (specific) mobile station apparatus 200. In other words, the DCI format B is mapped by the base station apparatus 100 in the mobile station apparatus specific search region (USS: UE specific Search Space).

The base station apparatus 100 includes the instruction of the transmission of the A-SRS in the DCI format B to transmit it to the mobile station apparatus 200, and thereby can provide the instruction of the transmission of the A-SRS to the mobile station apparatus 200. Here, the instruction of the transmission of the A-SRS can be realized by defining, for example, the information field (for example, an information field of one bit) for the instruction of the transmission of the A-SRS in the DCI format B.

The instruction of the transmission of the A-SRS can also be realized by setting, at a specific value, a specific information field (information) among the information fields (information) included in the DCI format B as described above. For example, the instruction of the transmission of the A-SRS can be realized by setting, at "0", the Flag for format differentiation included in the DCI format B and setting, at "1", the Resource block assignment. In this case, the remaining information fields (information fields other than the specific information field) included in the DCI format B can also be used as the information field (information field onto which the A-SRS parameter used when the mobile station apparatus 200 transmits the A-SRS is mapped) for transmitting the A-SRS.

Here, which information field (which information) included in the DCI format B is set at the corresponding value so as to provide the instruction of the transmission of the A-SRS is previously defined in specifications or the like, and can be made known between the base station apparatus 100 and the mobile station apparatus 200.

In other words, the base station apparatus 100 explicitly includes the instruction of the transmission of the A-SRS in the DCI format B to transmit it to the mobile station apparatus 200 (for example, to transmit information of one bit indicating the transmission of the A-SRS to the mobile station apparatus 200), and thereby can provide the instruction of the transmission of the A-SRS to the mobile station apparatus 200. The base station apparatus 100 also sets, at a specific value, a specific information field included in the DCI format B to transmit the instruction of the transmission of the A-SRS to the mobile station apparatus 200, and thereby can provide the instruction of the transmission of the A-SRS to the mobile station apparatus 200.

For example, the base station apparatus 100 includes the instruction of the transmission of the A-SRS in the DCI format including a plurality of TPC commands for a plurality of mobile station apparatuses 200 and transmits it, and thereby can provide the instruction of the transmission of the A-SRS to the mobile station apparatus 200. In other words, the base station apparatus 100 uses the DCI format 3/the DCI format 3A (which may be a DCI format similar to the DCI format 3/the DCI format 3A) as described above, and thereby can provide the instruction of the transmission of the A-SRS to the mobile station apparatus 200.

For simplicity, in the following description, the DCI format including a plurality of TPC commands for a plurality of mobile station apparatuses 200 (which may be the DCI format 3/the DCI format 3A or a DCI format similar to the DCI format 3/the DCI format 3A) is referred to as a DCI format C.

For example, the DCI format C is used when the base station apparatus 100 notifies of the TPC command for the PUCCH. For example, the DCI format C is also used when the TPC command for the PUSCH is notified. The base station apparatus 100 includes a plurality of TPC commands in the DCI format C, and thereby can transmit them to a plurality of mobile station apparatuses 200. In other words, the DCI format C is mapped in the common search region (CSS: Common Search Space).

Specifically, the field (information field) onto which the information (information bits) for a plurality of TPC commands is mapped is defined in the DCI format C. In other words, the DCI format C includes group scheduling information for a plurality of mobile station apparatuses 200.

For example, the base station apparatus 100 notifies the mobile station apparatus 200 of an identifier (hereinafter also referred to as a SRS-RNTI) and an index, and the mobile station apparatus 200 can recognize, as an information field for the apparatus, an information field corresponding to the index included in the DCI format C identified by the SRS-RNTI notified by the base station apparatus 100. Specifically, the base station apparatus 100 includes the instruction of the transmission of the A-SRS to a plurality of mobile station apparatuses 200 in each of the information fields of the DCI format C and transmits it, and thereby can provide the instruction of the transmission of the A-SRS to a plurality of mobile station apparatuses 200.

Here, the base station apparatus 100 notifies the mobile station apparatus 200 of a plurality of indices (notifies it of information capable of recognizing a plurality of information fields within the DCI format C), and also can use the information field included in the DCI format C as the information field for transmitting the A-SRS (information field onto which the A-SRS parameter used when the mobile station apparatus 200 transmits the A-SRS is mapped).

The mobile station apparatus 200, to which the instruction of the transmission of the A-SRS is provided by the base station apparatus 100, aperiodically transmits the A-SRS to the base station apparatus 100. For example, the mobile station apparatus 200 can transmit the A-SRS to the base station apparatus 100 in a subframe (for example, a subframe four subframes later) a predetermined number of frames after the subframe in which the DCI format (which may be transmitted on the PDCCH) including the instruction of the transmission of the A-SRS is notified from the base station apparatus 100.

The base station apparatus 100 can set, to the mobile station apparatus 200, subframes for transmission of the P-SRS by the mobile station apparatus 200 specific for the cell (cell specific) and/or specific for the mobile station apparatus (UE specific). The base station apparatus 100 can set, to the mobile station apparatus 200, subframes for transmission of the A-SRS by the mobile station apparatus 200 specific for the cell (cell specific) and/or specific for the mobile station apparatus (UE specific). In the following description, the subframes which are set by the base station apparatus 100 and in which the mobile station apparatus 200 transmits the P-SRS and/or the A-SRS is also referred to as SRS subframe.

For example, the base station apparatus 100 uses notification information (notification channel), and thereby can set the SRS subframes for the mobile station apparatus 200 specific for the cell. The base station apparatus 100 uses the RRC signaling, and thereby can set the SRS subframes for the mobile station apparatus 200 specific for the mobile station apparatus. For example, the base station apparatus 100 can set the SRS subframes by an offset value and a period from a certain subframe that is a standard.

The mobile station apparatus 200 can transmit the P-SRS in the SRS subframes set by the base station apparatus 100. For example, the mobile station apparatus 200 periodically transmits the P-SRS in the SRS subframes based on an interval set by the base station apparatus 100.

The mobile station apparatus 200 can transmit the A-SRS in the SRS subframes set by the base station apparatus 100. For example, the mobile station apparatus 200 transmits the A-SRS in the first SRS subframe after the subframe in which the DCI format including the instruction of the transmission of the A-SRS is notified by the base station apparatus 100. In other words, the mobile station apparatus 200 transmits the A-SRS in the first SRS subframe after the DCI format including the instruction of the transmission of the A-SRS is detected. The DCI format including the instruction of the transmission of the A-SRS is transmitted from the base station apparatus 100.

The base station apparatus 100 can set, for the mobile station apparatus 200, parameters (P-SRS parameters) used when the mobile station apparatus 200 transmits the P-SRS. For example, the base station apparatus 100 can set the P-SRS parameters for the mobile station apparatus 200 using the RRC signaling. Moreover, for example, the base station apparatus 100 can set the P-SRS parameters for the mobile station apparatus 200 using the PDCCH.

Here, the P-SRS parameters include an interval (transmission interval) when the mobile station apparatus 200 transmits the P-SRS. The P-SRS parameters also include a transmission bandwidth (SRS transmission bandwidth) for transmission of the P-SRS by the mobile station apparatus 200. The P-SRS parameters also include a cyclic shift (CS: Cyclic Shift) used for maintaining orthogonality between the mobile station apparatuses 200 or between the signals. The P-SRS parameters also include information indicating a frequency allocation position indicating a frequency position where the P-SRS is mapped. The P-SRS parameters also include the number of times of transmission or a transmission stop time for completing the transmission of the P-SRS. The P-SRS parameters also include an antenna port (antenna index) for transmitting the P-SRS. The P-SRS parameters also include a multiple antenna simultaneous transmission flag indicating whether or not, as in the MIMO, a plurality of antennas are used simultaneously to transmit the P-SRS. The P-SRS parameters also include a TPC command (transmit power control information) for the P-SRS.

The base station apparatus 100 can set, for the mobile station apparatus 200, parameters (A-SRS parameters) used when the mobile station apparatus 200 transmits the A-SRS. For example, the base station apparatus 100 can set the A-SRS parameters for the mobile station apparatus 200 using the RRC signaling. Moreover, for example, the base station apparatus 100 can set the A-SRS parameters for the mobile station apparatus 200 using the PDCCH. As described above, the base station apparatus 100 sets the code point in the DCI format, and thereby can allocate the A-SRS parameters to the mobile station apparatus 200.

Here, the A-SRS parameters include a transmission bandwidth (SRS transmission bandwidth) for transmission of the A-SRS by the mobile station apparatus 200. The A-SRS parameters also include a cyclic shift (CS: Cyclic Shift) used for maintaining orthogonality between the mobile station apparatuses 200 or between the signals. The A-SRS parameters also include information indicating a frequency allocation position indicating a frequency position where the A-SRS is mapped. The A-SRS parameters also include the number of times of transmission or a transmission stop time for completing the transmission of the A-SRS. The A-SRS parameters also include an antenna port (antenna index) for transmitting the A-SRS. The A-SRS parameters also include a multiple antenna simultaneous transmission flag indicating whether or not, as in the MIMO, a plurality of antennas are used simultaneously to transmit the A-SRS. The A-SRS parameters also include a TPC command (transmit power control information) for the A-SRS.

Here, the A-SRS parameters may be set for each DCI format indicating the transmission of the A-SRS. For example, the A-SRS parameters used for the transmission of the A-SRS which is instructed using the DCI format A by the base station apparatus 100, the A-SRS parameters used for the transmission of the A-SRS which is instructed using the DCI format B by the base station apparatus 100, and the A-SRS parameters used for the transmission of the A-SRS which is instructed using the DCI format C by the base station apparatus 100 may be independently set. The mobile station apparatus 200 changes the A-SRS parameters based on the DCI format including the instruction of the transmission of the A-SRS transmitted from the base station apparatus 100, and thereby can transmit the A-SRS to the base station apparatus 100. In other words, the base station apparatus 100 sets the A-SRS parameters as described above, and thereby can appropriately set the A-SRS parameters based on the usage of the DCI format used.

Moreover, the A-SRS parameters may be set as a common set of A-SRS parameters (a single set of A-SRS parameters) without depending on the DCI format indicating the transmission of the A-SRS. In case that the DCI format including the instruction of the transmission of the A-SRS is notified from the base station apparatus 100, the mobile station apparatus 200 uses a single set of A-SRS parameters, and thereby can transmit the A-SRS to the base station apparatus 100 without depending on the DCI format (even if the transmission of the A-SRS is instructed using any DCI format).

Figure 5:
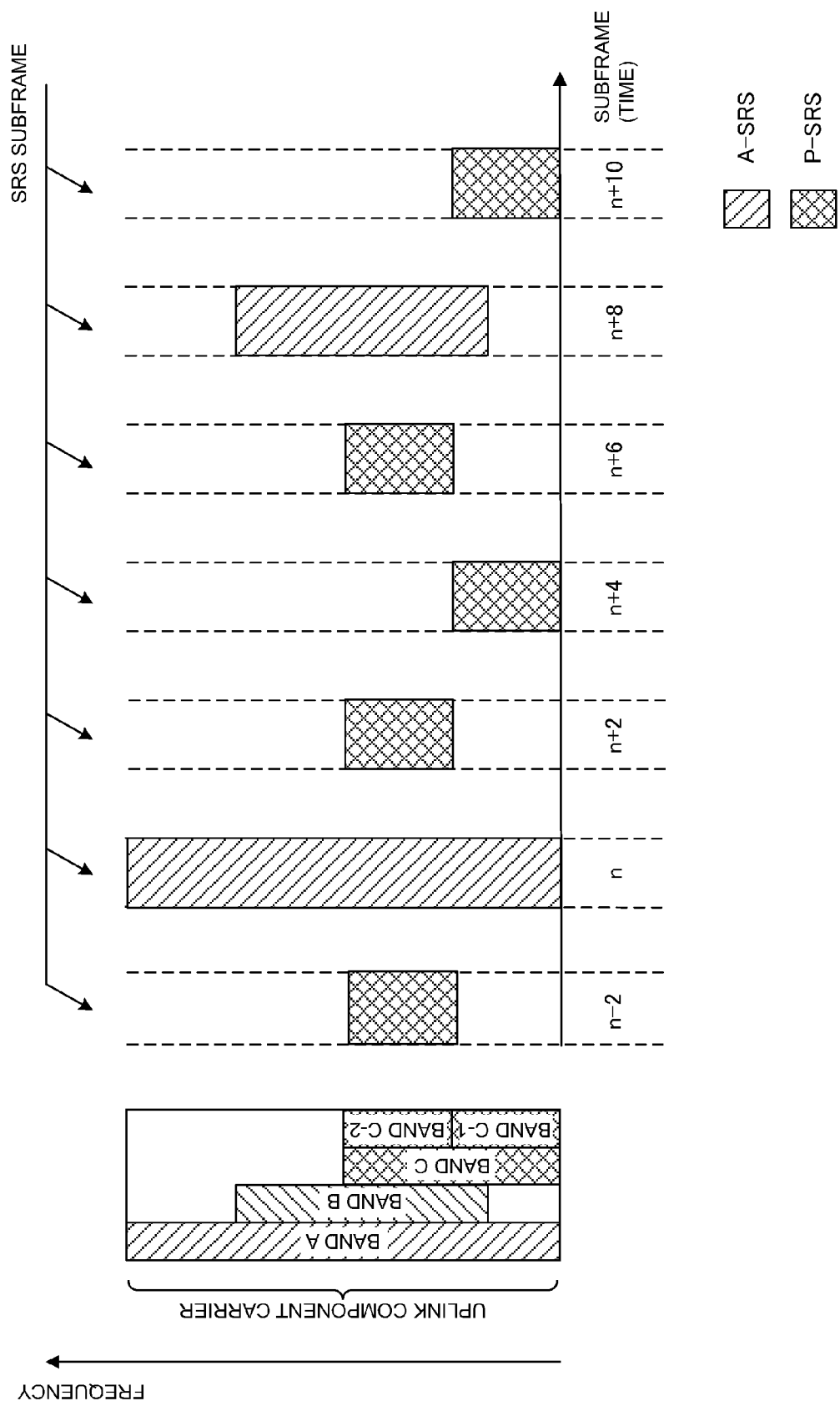
FIG. 5 is a diagram showing an example of the transmission of an SRS by the mobile station apparatus.

FIG. 5 is a diagram showing an example of the transmission of the SRS (the P-SRS, the A-SRS) by the mobile station apparatus 200. In FIG. 5, the horizontal axis represents the subframe (time). The vertical axis represents the frequency (frequency band). Here, FIG. 5 shows, as an example, the transmission of the SRS within one uplink component carrier by the mobile station apparatus 200.

As shown in FIG. 5, for example, the base station apparatus 100 provides (set), to the mobile station apparatus 200, the instruction of the transmission of the SRS (the P-SRS, the A-SRS) for each uplink component carrier, and the mobile station apparatus 200 can also transmit, based on the instruction from the base station apparatus 100, the SRS (the P-SRS, the A-SRS) to the base station apparatus 100 for each uplink component carrier. In other words, for each uplink component carrier, the base station apparatus 100 can set the P-SRS parameters and/or the A-SRS parameters for the mobile station apparatus 200.

Here, each SC-FDMA symbol onto which the mobile station apparatus 200 maps the uplink signals is used for a different usage. For example, when the mobile station apparatus 200 maps the uplink signals onto seven SC-FDMA symbols (seven SC-FDMA symbols from the first to the sixth) and transmits them to the base station apparatus 100, the SRS (the P-SRS, the A-SRS) is mapped onto the sixth SC-FDMA symbol.

Although, for simplicity, in the following description, an expression that the mobile station apparatus 200 transmits the SRS (the P-SRS, the A-SRS) in the subframe is used, the SRS (the P-SRS, the A-SRS) may be mapped onto a certain SC-FDMA symbol within the subframe and transmitted to the base station apparatus 100. The simultaneous occurrence of the transmission of the P-SRS and the transmission of the A-SRS (the collision between the transmission of the P-SRS and the transmission of the A-SRS) may indicate that the transmission of the P-SRS and the transmission of the A-SRS simultaneously occur (collide) on a symbol level.

FIG. 5 shows that the base station apparatus 100 sets, as the SRS subframe, for the mobile station apparatus 200, a subframe n−2, a subframe n, a subframe n+2, a subframe n+4, a subframe n+6, a subframe n+8 and a subframe n+10. The mobile station apparatus 200 can transmit the SRS (the P-SRS, the A-SRS) to the base station apparatus 100 in the SRS subframe set by the base station apparatus 100.

The mobile station apparatus 200 can transmit the A-SRS in a subframe a predetermined number of frames after (for example, a subframe four subframes later) the subframe in which the DCI format including the instruction of the transmission of the A-SRS is notified from the base station apparatus 100. The mobile station apparatus 200 can transmit the A-SRS in the first SRS subframe (subframe in which the SRS can be transmitted) after the subframe in which the DCI format (which may be transmitted on the PDCCH) including the instruction of the transmission of the A-SRS is notified from the base station apparatus 100.

FIG. 5 shows that the mobile station apparatus 200 transmits, to the base station apparatus 100, based on the instruction from the base station apparatus 100, the P-SRS (represented by net lines) in the subframe n−2, the subframe n+2, the subframe n+4, the subframe n+6 and the subframe n+10. In other words, the mobile station apparatus 200 periodically transmits the P-SRS (every two subframes, every 2 ms) based on the interval (every two subframes, every 2 ms) set by the base station apparatus 100.

Here, in the subframe n+4 and the subframe n+10, the mobile station apparatus 200 transmits, based on a transmission bandwidth (SRS transmission bandwidth) set by the base station apparatus 100, the P-SRS to the base station apparatus 100 in a band C-1 that is part of a band C (part of the bands obtained by diving the band C). Moreover, in the subframe n−2, the subframe n+2 and the subframe n+6, the mobile station apparatus 200 transmits, based on the transmission bandwidth (SRS transmission bandwidth) set by the base station apparatus 100, the P-SRS to the base station apparatus 100 in a band C-2 that is part of the band C (part of the bands obtained by diving the band C). Here, the order in which the mobile station apparatus 200 transmits the P-SRS in a certain band (the band C-1, the band C-2) is previously defined (which may be set by the base station apparatus 100). The base station apparatus 100 can set for the mobile station apparatus 200 such that the P-SRS is transmitted only once.

FIG. 5 shows that the mobile station apparatus 200 transmits, based on the instruction from the base station apparatus 100, the A-SRS (represented by oblique lines) to the base station apparatus 100 in the subframe n and the subframe n+8.

Here, in the subframe n, the mobile station apparatus 200 transmits, based on the transmission bandwidth (SRS transmission bandwidth) set by the base station apparatus 100, the A-SRS to the base station apparatus 100 in a band A. In the subframe n+8, the mobile station apparatus 200 transmits, based on the transmission bandwidth (SRS transmission bandwidth) set by the base station apparatus 100, the A-SRS to the base station apparatus 100 in a band B.

In FIG. 5, the subframe n and the subframe n+8 indicate a subframe in which the transmission of the P-SRS and the transmission of the A-SRS are performed simultaneously. In FIG. 5, in case that the transmission of the P-SRS and the transmission of the A-SRS are occurred at the same time, the mobile station apparatus 200 can transmit the A-SRS to the base station apparatus 100 without transmitting (while dropping) the P-SRS. Here, in case that the transmission of the P-SRS and the transmission of the A-SRS are occurred at the same time, the mobile station apparatus 200 multiplexes the P-SRS and the A-SRS, and can transmit both of them to the base station apparatus 100. For example, in case that the transmission of the P-SRS and the transmission of the A-SRS are occurred at the same time, the mobile station apparatus 200 code-multiplexes the P-SRS and the A-SRS, and can transmit both of them to the base station apparatus 100.

Here, although FIG. 5 shows, as an example, that the mobile station apparatus 200 transmits the SRS (the P-SRS, the A-SRS) in all the SRS subframes set by the base station apparatus 100, when the instruction of the transmission of the SRS is not provided by the base station apparatus 100, the mobile station apparatus 200 does not transmit the SRS. In other words, the mobile station apparatus 200 may not transmit the SRS in all the SRS subframes set by the base station apparatus 100.

Figure 6:
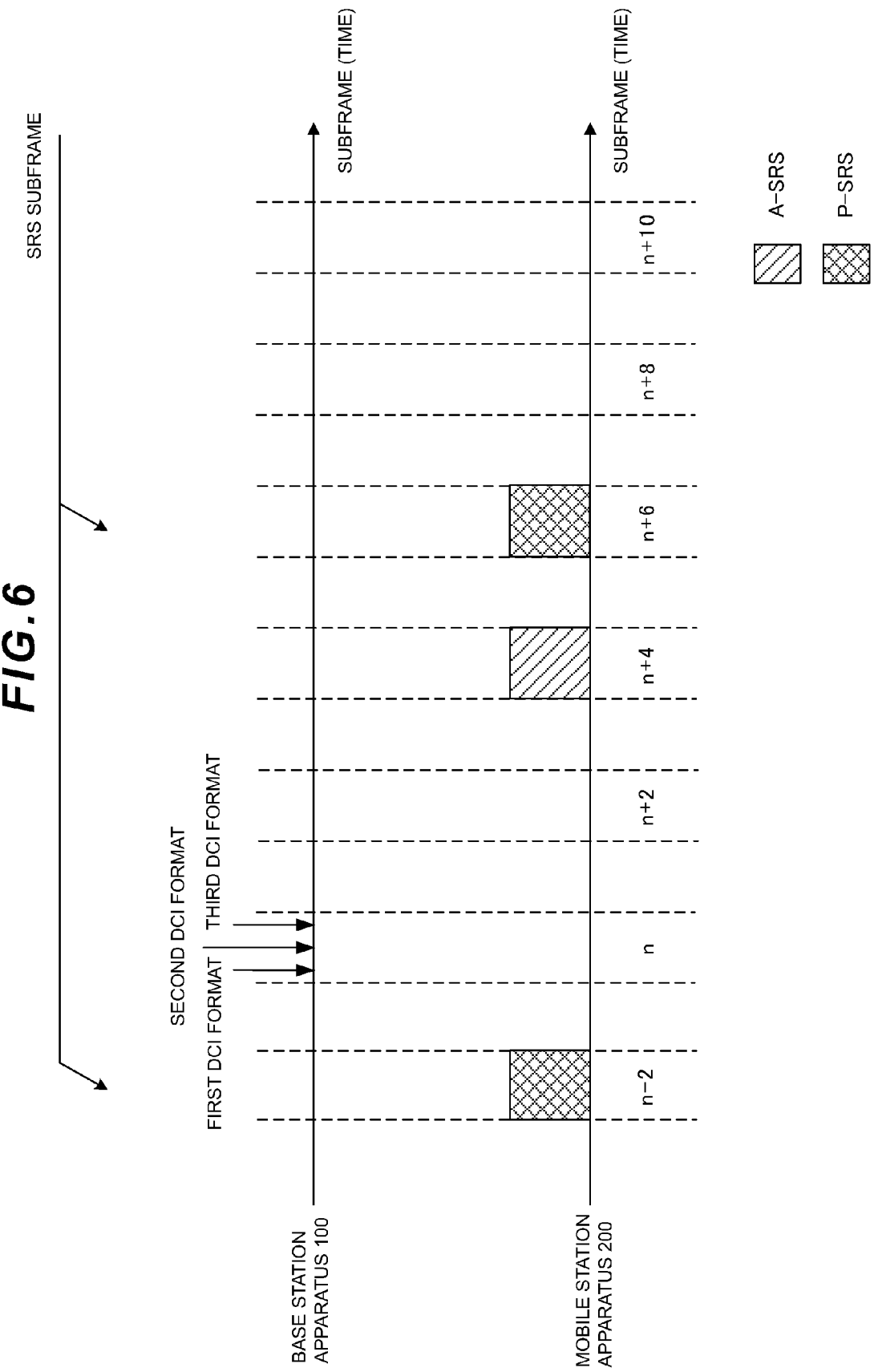
FIG. 6 is a diagram showing an example of the transmission of an A-SRS by the mobile station apparatus.

FIG. 6 is a diagram illustrating an example of the transmission of the A-SRS by the mobile station apparatus 200. In FIG. 6, the horizontal axis represents a subframe (time). It is also shown that the base station apparatus 100 sets, for the mobile station apparatus 200, the subframe n−2 and the subframe n+6 as the SRS subframe. It is also shown that the mobile station apparatus 200 transmits the P-SRS (represented by net lines) in the subframe n−2 and the subframe n+6 set by the base station apparatus 100. It is also shown that the mobile station apparatus 200 transmits the A-SRS (represented by oblique lines) in the subframe n+4.

In FIG. 6, the base station apparatus 100 can notify, in the same subframe, the mobile station apparatus 200 of a plurality of DCI formats including at least one DCI format including the instruction of the transmission of the A-SRS. In other words, the base station apparatus 100 can notify, in the same subframe, the mobile station apparatus 200 of a plurality of different DCI formats. FIG. 6 shows that the base station apparatus 100 notifies, in the subframe n, the mobile station apparatus 200 of a plurality of DCI formats (indicated by the first DCI format, the second DCI format and the third DCI format) including at least one DCI format including the instruction of the transmission of the A-SRS.

Here, although FIG. 6 shows, as an example, that the base station apparatus 100 notifies, in the same subframe, the mobile station apparatus 200 of three DCI formats, it is needless to say that the number of DCI formats notified by the base station apparatus 100 in the same subframe is not limited.

Here, the DCI format notified by the base station apparatus 100 to the mobile station apparatus 200 includes the DCI format A, the DCI format B and the DCI format C as described above. The DCI format notified by the base station apparatus 100 to the mobile station apparatus 200 includes the DCI format A including the instruction of the transmission of the A-SRS, the DCI format B including the instruction of the transmission of the A-SRS and the DCI format C including the instruction of the transmission of the A-SRS as described above.

In FIG. 6, the mobile station apparatus 200 to which the base station apparatus 100 notifies, in the same subframe, of a plurality of DCI formats including at least one DCI format including the instruction of the transmission of the A-SRS can transmit the A-SRS to the base station apparatus 100 in case that a predetermined DCI format among a plurality of DCI formats includes the instruction of the transmission of the A-SRS. FIG. 6 shows that the mobile station apparatus 200 transmits the A-SRS to the base station apparatus 100 in a subframe (subframe n+4) four subframes after the subframe in which the DCI format including the instruction of the transmission of the A-SRS is notified from the base station apparatus 100.

For example, the mobile station apparatus 200 can transmit the A-SRS to the base station apparatus 100 in case that the DCI format A among a plurality of DCI formats notified from the base station apparatus 100 includes the instruction of the transmission of the A-SRS (in case that the DCI format A including the instruction of the transmission of the A-SRS is notified or in case that the DCI format A including the instruction of the transmission of the A-SRS is detected).

Further, for example, the mobile station apparatus 200 can transmit the A-SRS to the base station apparatus 100 in case that the DCI format B among a plurality of DCI formats notified from the base station apparatus 100 includes the instruction of the transmission of the A-SRS (in case that the DCI format B including the instruction of the transmission of the A-SRS is notified or in case that the DCI format B including the instruction of the transmission of the A-SRS is detected).

Further, for example, the mobile station apparatus 200 can transmit the A-SRS to the base station apparatus 100 in case that the DCI format C among a plurality of DCI formats notified from the base station apparatus 100 includes the instruction of the transmission of the A-SRS (in case that the DCI format C including the instruction of the transmission of the A-SRS is notified or in case that the DCI format C including the instruction of the transmission of the A-SRS is detected).

Here, which DCI format includes the instruction of the transmission of the A-SRS among a plurality of DCI formats notified from the base station apparatus 100 such that the mobile station apparatus 200 transmits the A-SRS is previously defined by specifications or the like. In other words, which DCI format includes the instruction of the transmission of the A-SRS among a plurality of DCI formats notified from the base station apparatus 100 such that the A-SRS is transmitted and received between the base station apparatus 100 and the mobile station apparatus 200 is previously defined.

Which DCI format includes the instruction of the transmission of the A-SRS among a plurality of DCI formats notified from the base station apparatus 100 such that the mobile station apparatus 200 transmits the A-SRS may be set by the base station apparatus 100 using, for example, the RRC signaling. For example, in case that the DCI format A includes the instruction of the transmission of the A-SRS, the base station apparatus 100 can set the transmission of the A-SRS for the mobile station apparatus 200.

In FIG. 6, the mobile station apparatus 200 to which the base station apparatus 100 notifies, in the same subframe, of a plurality of DCI formats including at least one DCI format including the instruction of the transmission of the A-SRS preferentially uses a predetermined DCI format among a plurality of DCI formats, and can transmit the A-SRS to the base station apparatus 100 when the DCI format preferentially used includes the instruction of the transmission of the A-SRS.

For example, when the mobile station apparatus 200 preferentially uses the DCI format A among a plurality of DCI formats notified from the base station apparatus 100, and the DCI format preferentially used includes the instruction of the transmission of the A-SRS, the mobile station apparatus 200 can transmit the A-SRS to the base station apparatus 100.

For example, when the mobile station apparatus 200 preferentially uses the DCI format B among a plurality of DCI formats notified from the base station apparatus 100, and the DCI format B preferentially used includes the instruction of the transmission of the A-SRS, the mobile station apparatus 200 can transmit the A-SRS to the base station apparatus 100.

For example, when the mobile station apparatus 200 preferentially uses the DCI format C among a plurality of DCI formats notified from the base station apparatus 100, and the DCI format C preferentially used includes the instruction of the transmission of the A-SRS, the mobile station apparatus 200 can transmit the A-SRS to the base station apparatus 100.

Here, which DCI format is preferentially used by the mobile station apparatus 200 among a plurality of DCI formats notified from the base station apparatus 100 is previously defined by specifications or the like. In other words, when the base station apparatus 100 notifies, in the same subframe, the mobile station apparatus 200 of a plurality of DCI formats, according to which DCI format the mobile station apparatus 200 is operated is previously defined. In other words, when a plurality of DCI formats are notified from the base station apparatus 100, according to which DCI format among a plurality of DCI formats an operation is performed is previously defined between the base station apparatus 100 and the mobile station apparatus 200.

According to which DCI format among a plurality of DCI formats notified from the base station apparatus 100 the mobile station apparatus 200 is operated may be set by the base station apparatus 100 using, for example, the RRC signaling. For example, the base station apparatus 100 can set, for the mobile station apparatus 200, the operation of the mobile station apparatus 200 corresponding to the DCI format A.

For example, the following is previously defined: between the base station apparatus 100 and the mobile station apparatus 200, among a plurality of DCI formats notified from the base station apparatus 100, the DCI format B including the instruction of the transmission of the A-SRS is most preferentially used, then the DCI format C including the instruction of the transmission of the A-SRS is preferentially used and then the DCI format A including the instruction of the transmission of the A-SRS is preferentially used. In other words, when a plurality of DCI formats are notified from the base station apparatus 100, that an operation is performed according to the DCI format B including the instruction of the transmission of the A-SRS is previously defined between the base station apparatus 100 and the mobile station apparatus 200.

Further, for example, the following is previously defined: between the base station apparatus 100 and the mobile station apparatus 200, among a plurality of DCI formats notified from the base station apparatus 100, the DCI format C is most preferentially used, then the DCI format C including the instruction of the transmission of the A-SRS is preferentially used, then the DCI format A is preferentially used, then the DCI format A including the instruction of the transmission of the A-SRS is preferentially used, then the DCI format B is preferentially used and then the DCI format B including the instruction of the transmission of the A-SRS is preferentially used. In other words, when a plurality of DCI formats are notified from the base station apparatus 100, that an operation is performed according to the DCI format C is previously defined between the base station apparatus 100 and the mobile station apparatus 200.

For example, the following may be previously defined: between the base station apparatus 100 and the mobile station apparatus 200, among a plurality of DCI formats notified from the base station apparatus 100, the DCI format B is most preferentially used, then the DCI format A is preferentially used and the DCI format C is preferentially used. In other words, only the priority of the DCI format A, the DCI format B and the DCI format C may be previously defined. In other words, when a plurality of DCI formats (the DCI format A, the DCI format B and the DCI format C) are notified from the base station apparatus 100, according to which DCI format among a plurality of DCI formats an operation is performed may be previously defined between the base station apparatus 100 and the mobile station apparatus 200.

For example, the mobile station apparatus 200 previously defined such that it is operated according to the DCI format B among a plurality of DCI formats notified from the base station apparatus 100 can transmit the A-SRS to the base station apparatus 100 when the DCI format B notified from the base station apparatus 100 includes the instruction of the transmission of the A-SRS. In other words, the mobile station apparatus 200 previously defined such that it is operated according to the DCI format B among a plurality of DCI formats notified from the base station apparatus 100 can transmit the A-SRS to the base station apparatus 100 according to the DCI format B including the instruction of the transmission of the A-SRS.

Further, for example, the mobile station apparatus 200 previously defined such that it is operated according to the DCI format B among a plurality of DCI formats notified from the base station apparatus 100 does not transmit the A-SRS to the base station apparatus 100 even if the DCI format A and/or the DCI format C notified from the base station apparatus 100 includes the instruction of the transmission of the A-SRS. For example, the mobile station apparatus 200 previously defined such that it is operated according to the DCI format B among a plurality of DCI formats notified from the base station apparatus 100 uses the PUSCH scheduled by the DCI format B excluding the instruction of the transmission of the A-SRS to transmit the uplink data to the base station apparatus 100.

In FIG. 6, the mobile station apparatus 200 to which a plurality of DCI formats are notified from the base station apparatus 100 in the same subframe can transmit the A-SRS to the base station apparatus 100 in case that all the DCI formats include the instruction of the transmission of the A-SRS.

For example, the mobile station apparatus 200 can transmit the A-SRS to the base station apparatus 100 in case that all the DCI formats (the first DCI format, the second DCI format and the third DCI format) notified from the base station apparatus 100 include the instruction of the transmission of the A-SRS.

As has been described above, in case that the base station apparatus 100 notifies, in the same subframe, the mobile station apparatus 200 of a plurality of DCI formats, if the instruction of the transmission of the A-SRS is included in a predetermined DCI format, the mobile station apparatus 200 transmits the A-SRS to the base station apparatus 100, and thus that the mobile station apparatus 200 transmits the A-SRS can be shared (recognized) between the base station apparatus 100 and the mobile station apparatus 200.

In case that the base station apparatus 100 notifies, in the same subframe, the mobile station apparatus 200 of a plurality of (different) DCI formats, if the instruction of the transmission of the A-SRS is included in all the DCI formats, the mobile station apparatus 200 transmits the A-SRS to the base station apparatus 100, and thus that the mobile station apparatus 200 transmits the A-SRS can be shared (recognized) between the base station apparatus 100 and the mobile station apparatus 200.

The base station apparatus 100 schedules the mobile station apparatus 200 based on the A-SRS transmitted from the mobile station apparatus 200, and thereby can perform, for example, the allocation of the PUSCH resources and the determination of a modulation scheme and a coding rate performed on the PUSCH. In other words, efficient scheduling can be performed on the mobile station apparatus 200 by the base station apparatus 100.

Second Embodiment

A second embodiment of a mobile communication system using the base station apparatus 100 and the mobile station apparatus 200 will now be described. In the second embodiment, the base station apparatus 100 notifies, in a specific period, the mobile station apparatus 200 of a plurality of DCI formats including at least one DCI format including the instruction of the transmission of the SRS, and the mobile station apparatus 200 transmits the SRS to the base station apparatus 100 in case that a predetermined DCI format among a plurality of DCI formats includes the instruction of the transmission of the SRS.

The base station apparatus 100 notifies, in the specific period, the mobile station apparatus 200 of a plurality of DCI formats including at least one DCI format including the instruction of the transmission of the SRS, and the mobile station apparatus 200 transmits the SRS to the base station apparatus 100 in case that the DCI format notified in a subframe closest to the subframe a predetermined number of subframes before the subframe in which the SRS is transmitted.

The base station apparatus 100 notifies, in the specific period, the mobile station apparatus 200 of a plurality of DCI formats, and the mobile station apparatus 200 transmits the SRS to the base station apparatus 100 in case that all the plurality of DCI formats include the instruction of the transmission of the SRS.

Here, the specific period includes a period from the subframe subsequent to the subframe in which the mobile station apparatus 200 transmits the SRS to the base station apparatus 100 to a subframe in which the mobile station apparatus 200 transmits the SRS again to the base station apparatus 100. The specific period also includes a period from the subframe in which the mobile station apparatus 200 transmits the SRS to the base station apparatus 100 to a subframe in which the mobile station apparatus 200 transmits the SRS again to the base station apparatus 100. In other words, the specific period includes a period between the SRS subframes (successive SRS subframes) set by the base station apparatus 100. For example, the specific period includes a period from the subframe n−1 to the subframe n+6 in FIG. 7. For example, the specific period includes a period from the subframe n−2 to the subframe n+6 in FIG. 7.

The specific period includes a period from the subframe subsequent to the subframe in which the mobile station apparatus 200 transmits the SRS to the base station apparatus 100 to a subframe (for example, a subframe four subframes before) a predetermined number of subframes before a subframe in which the mobile station apparatus 200 transmits the SRS again to the base station apparatus 100. The specific period includes a period from the subframe in which the mobile station apparatus 200 transmits the SRS to the base station apparatus 100 to a subframe (for example, a subframe four subframes before) a predetermined number of subframes before a subframe in which the mobile station apparatus 200 transmits the SRS again to the base station apparatus 100. For example, the specific period includes a period from the subframe n−1 to the subframe n+2 in FIG. 7. For example, the specific period includes a period from the subframe n−2 to the subframe n+2 in FIG. 7.

Here, the subframe in which the mobile station apparatus 200 transmits the SRS to the base station apparatus 100 includes a subframe in which the mobile station apparatus 200 transmits the P-SRS to the base station apparatus 100. The subframe in which the mobile station apparatus 200 transmits the SRS to the base station apparatus 100 includes a subframe in which the mobile station apparatus 200 transmits the A-SRS to the base station apparatus 100.

The specific period includes a period that is set from the base station apparatus 100 to the mobile station apparatus 200. For example, the base station apparatus 100 uses notification information, and thereby can set the specific period for the mobile station apparatus 200. For example, the base station apparatus 100 uses the RRC signaling, and thereby can set the specific period for the mobile station apparatus 200.

The base station apparatus 100 can set, for the mobile station apparatus 200, the subframe in which the mobile station apparatus 200 transmits the SRS to the base station apparatus 100, specific for the cell. The base station apparatus 100 can set, for the mobile station apparatus 200, the subframe in which the mobile station apparatus 200 transmits the SRS to the base station apparatus 100, specific for the mobile station apparatus. The mobile station apparatus 200 can transmit the SRS to the base station apparatus 100 in the subframe set from the base station apparatus 100.

The base station apparatus 100 can map the DCI format including the instruction of the transmission of the SRS in the mobile station apparatus specific search region (USS: UE specific Search Space). Here, the base station apparatus 100 includes information on the downlink scheduling in the DCI format including the instruction of the transmission of the SRS mapped in the USS, and thereby can notify it to the mobile station apparatus 200. The base station apparatus 100 includes information on the uplink scheduling in the DCI format including the instruction of the transmission of the SRS mapped in the USS, and thereby can notify it to the mobile station apparatus 200.

Further, the base station apparatus 100 can map the DCI format including the instruction of the transmission of the SRS in the common search region (CSS: Common Search Space).

The second embodiment can be applied to a mobile communication system similar to the mobile communication system described in the first embodiment. In other words, the second embodiment can be applied even to any of mobile communication systems that are subjected to symmetric frequency aggregation and asymmetric frequency aggregation.

As described in the first embodiment, the base station apparatus 100 can provide the instruction of the transmission of the P-SRS to the mobile station apparatus 200. The base station apparatus 100 can provide the instruction of the transmission of the A-SRS to the mobile station apparatus 200. Here, since the instruction of the transmission of the P-SRS and the instruction of the transmission of the A-SRS provided by the base station apparatus 100 have been described in the first embodiment, the description will not be repeated.

The mobile station apparatus 200 can periodically transmit the P-SRS to the base station apparatus 100 based on the instruction from the base station apparatus 100. The mobile station apparatus 200 can aperiodically transmit the A-SRS to the base station apparatus 100 based on the instruction from the base station apparatus 100. Here, since the transmission of the P-SRS and the transmission of the A-SRS by the base station apparatus 100 have been described in the first embodiment, the description will not be repeated.

Figure 7:
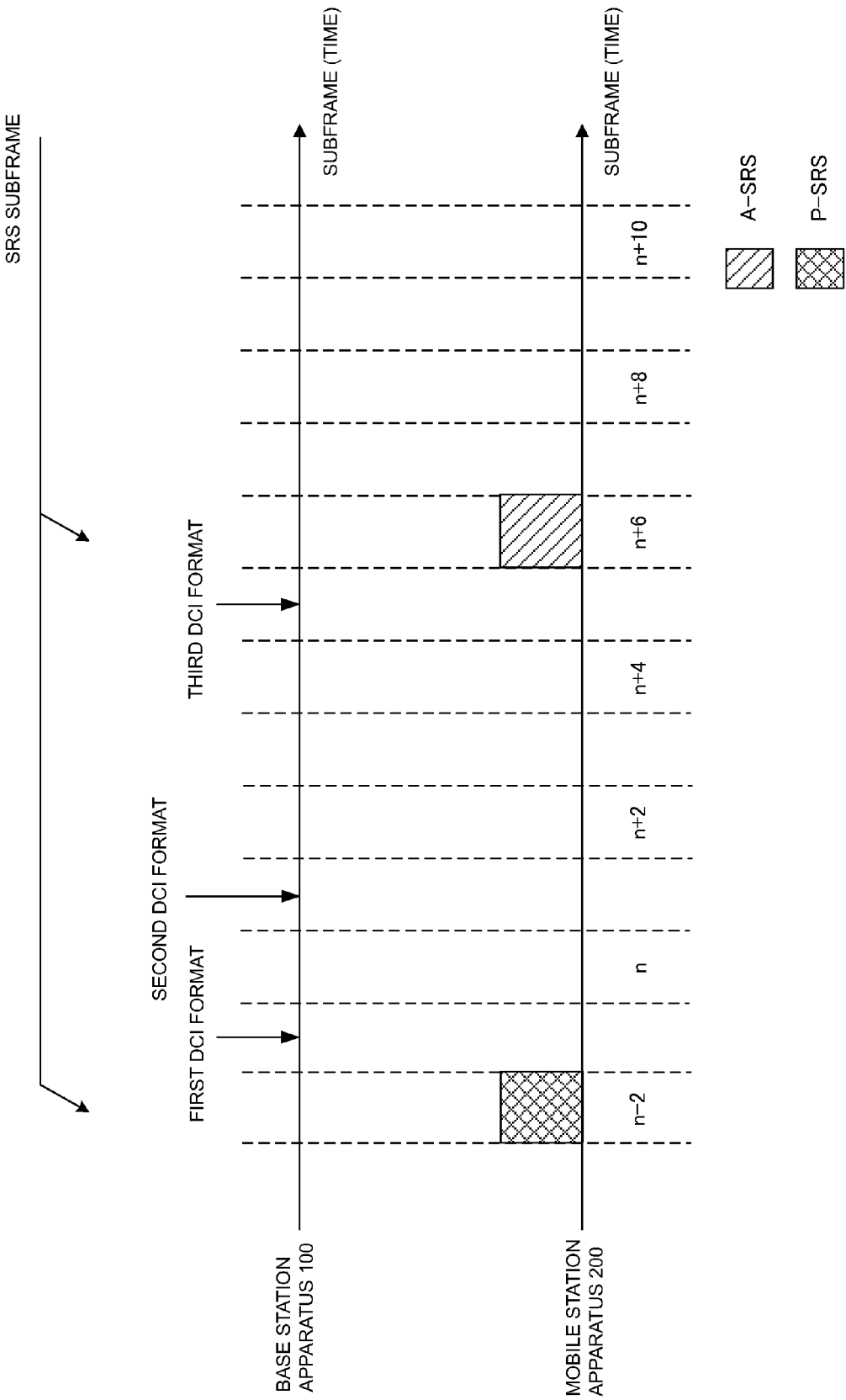
FIG. 7 is another diagram showing an example of the transmission of an A-SRS by the mobile station apparatus.
Figure 8:
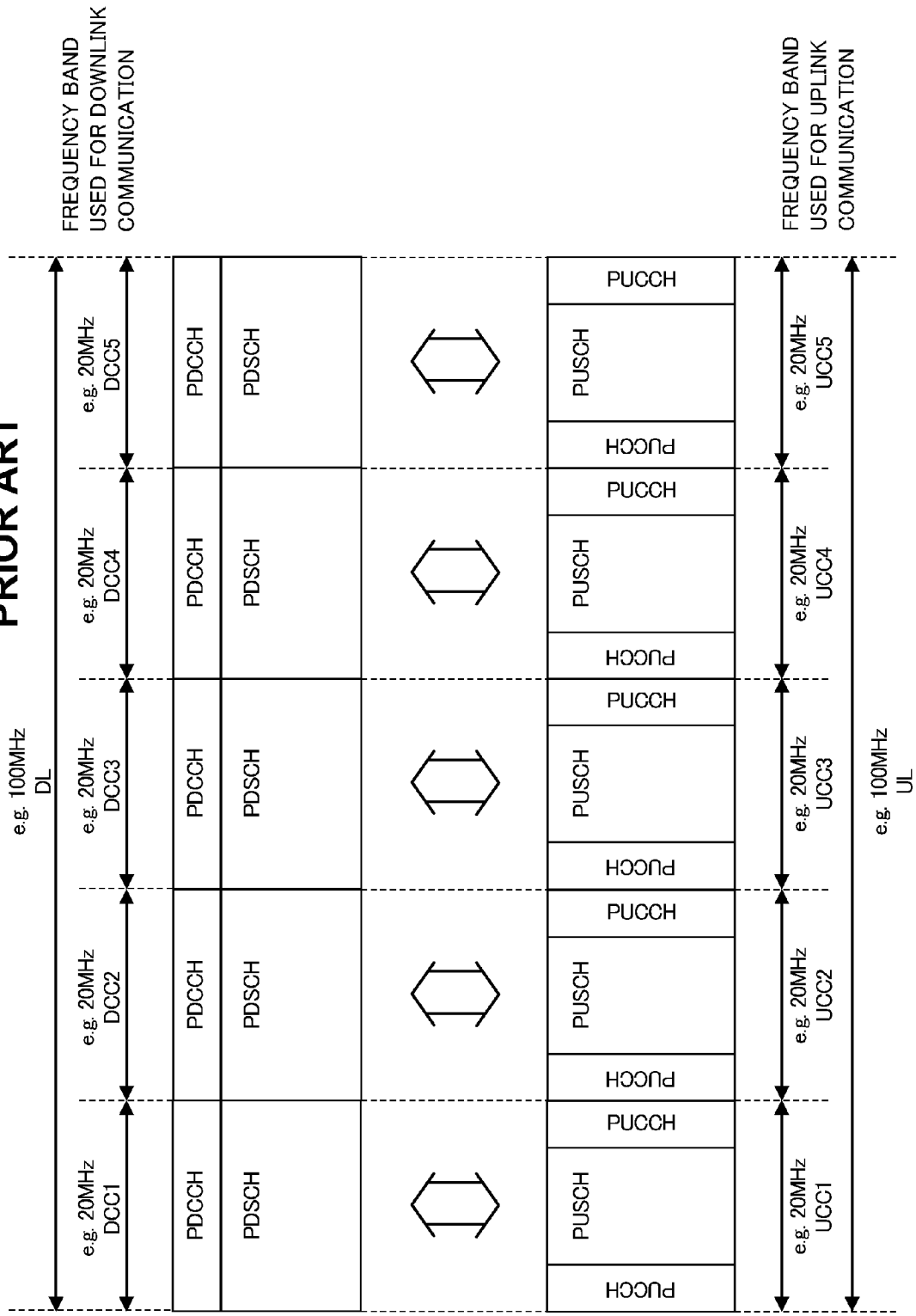
FIG. 8 is a diagram showing an example of frequency band aggregation in a conventional technology.

FIG. 7 is a diagram illustrating an example of the transmission of the A-SRS by the mobile station apparatus 200. In FIG. 7, the horizontal axis represents a subframe (time). It is also shown that the base station apparatus 100 sets, for the mobile station apparatus 200, the subframe n−2 and the subframe n+6 as the SRS subframe. It is also shown that the mobile station apparatus 200 transmits the P-SRS (represented by net lines) in the subframe n−2 set by the base station apparatus 100. It is also shown that the mobile station apparatus 200 transmits the A-SRS (represented by oblique lines) in the subframe n+6 set by the base station apparatus 100.

In FIG. 7, the mobile station apparatus 200 transmits the A-SRS in the first SRS subframe (subframe in which the SRS can be transmitted) after the subframe in which the DCI format (which may be transmitted on the PDCCH) including the instruction of the transmission of the A-SRS is notified from the base station apparatus 100.

In FIG. 7, the base station apparatus 100 can notify, in a specific period, the mobile station apparatus 200 of a plurality of DCI formats including at least one DCI format including the instruction of the transmission of the A-SRS. In other words, the base station apparatus 100 can notify, in the specific period, the mobile station apparatus 200 of a plurality of different DCI formats. FIG. 7 shows that the base station apparatus 100 notifies, in the subframes n−1, n+1 and n+5, the mobile station apparatus 200 of a plurality of DCI formats (indicated by the first DCI format, the second DCI format and the third DCI format) including at least one DCI format including the instruction of the transmission of the A-SRS.

Here, although, in the following description, the specific period is a period from the subframe subsequent to the subframe in which the mobile station apparatus 200 transmits the SRS to the base station apparatus 100 to a subframe in which the mobile station apparatus 200 transmits the SRS again to the base station apparatus 100, it is needless to say that similar embodiments can be applied in the period described above. Although, in FIG. 7, as an example, the base station apparatus 100 notifies, in the specific period, the mobile station apparatus 200 of three DCI formats, it is needless to say that the number of DCI formats notified by the base station apparatus 100 in the specific period is not limited.

Here, the DCI format notified by the base station apparatus 100 to the mobile station apparatus 200 includes the DCI format A, the DCI format B and the DCI format C as described above. The DCI format notified by the base station apparatus 100 to the mobile station apparatus 200 includes the DCI format A including the instruction of the transmission of the A-SRS, the DCI format B including the instruction of the transmission of the A-SRS and the DCI format C including the instruction of the transmission of the A-SRS as described above.

In FIG. 7, the mobile station apparatus 200 to which the base station apparatus 100 notifies, in the specific period, a plurality of DCI formats including at least one DCI format including the instruction of the transmission of the A-SRS can transmit the A-SRS to the base station apparatus 100 when a predetermined DCI format among a plurality of DCI formats includes the instruction of the transmission of the A-SRS.

For example, the mobile station apparatus 200 can transmit the A-SRS to the base station apparatus 100 in case that the DCI format A among a plurality of DCI formats notified from the base station apparatus 100 includes the instruction of the transmission of the A-SRS (in case that the DCI format A including the instruction of the transmission of the A-SRS is notified or in case that the DCI format A including the instruction of the transmission of the A-SRS is detected).

Further, for example, the mobile station apparatus 200 can transmit the A-SRS to the base station apparatus 100 in case that the DCI format B among a plurality of DCI formats notified from the base station apparatus 100 includes the instruction of the transmission of the A-SRS (in case that the DCI format B including the instruction of the transmission of the A-SRS is notified or in case that the DCI format B including the instruction of the transmission of the A-SRS is detected).

For example, the mobile station apparatus 200 can transmit the A-SRS to the base station apparatus 100 in case that the DCI format C among a plurality of DCI formats notified from the base station apparatus 100 includes the instruction of the transmission of the A-SRS (in case that the DCI format C including the instruction of the transmission of the A-SRS is notified or in case that the DCI format C including the instruction of the transmission of the A-SRS is detected).

Here, which DCI format includes the instruction of the transmission of the A-SRS among a plurality of DCI formats notified from the base station apparatus 100 such that the mobile station apparatus 200 transmits the A-SRS is previously defined by specifications or the like. In other words, which DCI format includes the instruction of the transmission of the A-SRS among a plurality of DCI formats notified from the base station apparatus 100 such that the A-SRS is transmitted and received between the base station apparatus 100 and the mobile station apparatus 200 is previously defined.

Further, which DCI format includes the instruction of the transmission of the A-SRS among a plurality of DCI formats notified from the base station apparatus 100 such that the mobile station apparatus 200 transmits the A-SRS may be set by the base station apparatus 100 using, for example, the RRC signaling. For example, in case that the DCI format A includes the instruction of the transmission of the A-SRS, the base station apparatus 100 can set the transmission of the A-SRS for the mobile station apparatus 200.

In FIG. 7, the mobile station apparatus 200 to which the base station apparatus 100 notifies, in the specific period, a plurality of DCI formats including at least one DCI format including the instruction of the transmission of the A-SRS, preferentially uses a predetermined DCI format among a plurality of DCI formats, and can transmit the A-SRS to the base station apparatus 100 when the DCI format preferentially used includes the instruction of the transmission of the A-SRS.

For example, when the mobile station apparatus 200 preferentially uses the DCI format A among a plurality of DCI formats notified from the base station apparatus 100, and the DCI format preferentially used includes the instruction of the transmission of the A-SRS, the mobile station apparatus 200 can transmit the A-SRS to the base station apparatus 100.

For example, when the mobile station apparatus 200 preferentially uses the DCI format B among a plurality of DCI formats notified from the base station apparatus 100, and the DCI format B preferentially used includes the instruction of the transmission of the A-SRS, the mobile station apparatus 200 can transmit the A-SRS to the base station apparatus 100.

For example, when the mobile station apparatus 200 preferentially uses the DCI format C among a plurality of DCI formats notified from the base station apparatus 100, and the DCI format C preferentially used includes the instruction of the transmission of the A-SRS, the mobile station apparatus 200 can transmit the A-SRS to the base station apparatus 100.

Here, which DCI format is preferentially used by the mobile station apparatus 200 among a plurality of DCI formats notified from the base station apparatus 100 is previously defined by specifications or the like. In other words, when the base station apparatus 100 notifies, in the specific period, the mobile station apparatus 200 of a plurality of DCI formats, according to which DCI format the mobile station apparatus 200 is operated is previously defined. In other words, when a plurality of DCI formats are notified from the base station apparatus 100, according to which DCI format among a plurality of DCI formats an operation is performed is previously defined between the base station apparatus 100 and the mobile station apparatus 200.

Further, according to which DCI format among a plurality of DCI formats notified from the base station apparatus 100 the mobile station apparatus 200 is operated may be set by the base station apparatus 100 using, for example, the RRC signaling. For example, the base station apparatus 100 can set, for the mobile station apparatus 200, the operation of the mobile station apparatus 200 corresponding to the DCI format A.

For example, the following is previously defined: between the base station apparatus 100 and the mobile station apparatus 200, among a plurality of DCI formats notified from the base station apparatus 100, the DCI format B including the instruction of the transmission of the A-SRS is most preferentially used, then the DCI format C including the instruction of the transmission of the A-SRS is preferentially used and then the DCI format A including the instruction of the transmission of the A-SRS is preferentially used. In other words, when a plurality of DCI formats are notified from the base station apparatus 100, that an operation is performed according to the DCI format B including the instruction of the transmission of the A-SRS is previously defined between the base station apparatus 100 and the mobile station apparatus 200.

Further, for example, the following is previously defined: between the base station apparatus 100 and the mobile station apparatus 200, among a plurality of DCI formats notified from the base station apparatus 100, the DCI format C is most preferentially used, then the DCI format C including the instruction of the transmission of the A-SRS is preferentially used, then the DCI format A is preferentially used, then the DCI format A including the instruction of the transmission of the A-SRS is preferentially used, then the DCI format B is preferentially used and then the DCI format B including the instruction of the transmission of the A-SRS is preferentially used. In other words, when a plurality of DCI formats are notified from the base station apparatus 100, that an operation is performed according to the DCI format C is previously defined between the base station apparatus 100 and the mobile station apparatus 200.

Further, for example, the following may be previously defined: between the base station apparatus 100 and the mobile station apparatus 200, among a plurality of DCI formats notified from the base station apparatus 100, the DCI format B is most preferentially used, then the DCI format A is preferentially used and the DCI format C is preferentially used. In other words, only the priority of the DCI format A, the DCI format B and the DCI format C may be previously defined. In other words, when a plurality of DCI formats (the DCI format A, the DCI format B and the DCI format C) are notified from the base station apparatus 100, according to which DCI format among a plurality of DCI formats an operation is performed may be previously defined between the base station apparatus 100 and the mobile station apparatus 200.

For example, the mobile station apparatus 200 previously defined such that it is operated according to the DCI format B among a plurality of DCI formats notified from the base station apparatus 100, can transmit the A-SRS to the base station apparatus 100 when the DCI format B notified from the base station apparatus 100 includes the instruction of the transmission of the A-SRS. In other words, the mobile station apparatus 200 previously defined such that it is operated according to the DCI format B among a plurality of DCI formats notified from the base station apparatus 100, can transmit the A-SRS to the base station apparatus 100 according to the DCI format B including the instruction of the transmission of the A-SRS.

Further, for example, the mobile station apparatus 200 previously defined such that it is operated according to the DCI format B among a plurality of DCI formats notified from the base station apparatus 100, does not transmit the A-SRS to the base station apparatus 100 even if the DCI format A and/or the DCI format C notified from the base station apparatus 100 includes the instruction of the transmission of the A-SRS. For example, the mobile station apparatus 200 previously defined such that it is operated according to the DCI format B among a plurality of DCI formats notified from the base station apparatus 100, uses the PUSCH scheduled by the DCI format B excluding the instruction of the transmission of the A-SRS to transmit the uplink data to the base station apparatus 100.

In FIG. 7, the mobile station apparatus 200 to which a plurality of DCI formats including at least one DCI format including the instruction of the transmission of the A-SRS are notified in the specific period from the base station apparatus 100, can transmit the A-SRS to the base station apparatus 100 in case that a DCI format notified in a subframe closest (recent, immediately preceding, the latest) to a subframe (for example, a subframe four subframes before) a predetermined number of subframes before a subframe in which the SRS is transmitted includes the instruction of the transmission of the A-SRS.

In other words, the mobile station apparatus 200 can be operated according to the DCI format notified in the subframe closest to the subframe (for example, a subframe four subframes before) the predetermined number of subframes before the subframe in which the SRS is transmitted.

For example, in FIG. 7, the mobile station apparatus 200 to which a plurality of DCI formats including at least one DCI format including the instruction of the transmission of the A-SRS are notified in the specific period (for example, a period from the subframe n−1 to the subframe n+6), transmits the A-SRS in the subframe n+6. In other words, the subframe in which the mobile station apparatus 200 transmits the SRS is the subframe n+6.

In other words, in FIG. 7, the mobile station apparatus 200 can transmit the A-SRS to the base station apparatus 100 when the DCI format notified in the subframe closest to the subframe (for example, the subframe n+2, that is, four subframes before) the predetermined number of subframes before the subframe (subframe n+6) in which the SRS is transmitted includes the instruction of the transmission of the A-SRS. In other words, the mobile station apparatus 200 can be operated based on the DCI format notified in the subframe closest to the subframe (for example, the subframe n+2, that is, four subframes before) the predetermined number of subframes before the subframe in which the SRS is transmitted.

In other words, in FIG. 7, the mobile station apparatus 200 can transmit the A-SRS to the base station apparatus 100 in case that the second DCI format notified in the subframe closest to the subframe (for example, the subframe n+2, that is, four subframes before) the predetermined number of subframes before the subframe (subframe n+6) in which the SRS is transmitted includes the instruction of the transmission of the A-SRS. In other words, the mobile station apparatus 200 can be operated based on the second DCI format notified in the subframe closest to the subframe (for example, the subframe n+2, that is, four subframes before) the predetermined number of subframes before the subframe (subframe n+6) in which the SRS is transmitted.

In FIG. 7, the mobile station apparatus 200 recognizing that it is operated based on the second DCI format among a plurality of DCI formats notified from the base station apparatus 100 can transmit the A-SRS to the base station apparatus 100 in case that the second DCI format notified from the base station apparatus 100 includes the instruction of the transmission of the A-SRS. In other words, the mobile station apparatus 200 recognizing that it is operated based on the second DCI format among a plurality of DCI formats notified from the base station apparatus 100 can transmit the A-SRS to the base station apparatus 100 based on the second DCI format including the instruction of the transmission of the A-SRS.

For example, the mobile station apparatus 200 recognizing that it is operated based on the second DCI format among a plurality of DCI formats notified from the base station apparatus 100 does not transmit the A-SRS to the base station apparatus 100 even if the first DCI format A and/or the third DCI format C notified from the base station apparatus 100 includes the instruction of the transmission of the A-SRS. For example, the mobile station apparatus 200 recognizing that it is operated based on the second DCI format among a plurality of DCI formats notified from the base station apparatus 100 uses the PUSCH scheduled by the second DCI format excluding the instruction of the transmission of the A-SRS to transmit the uplink data to the base station apparatus 100.

In FIG. 7, the mobile station apparatus 200 to which a plurality of DCI formats including at least one DCI format including the instruction of the transmission of the A-SRS are notified in the specific period from the base station apparatus 100, can transmit the A-SRS to the base station apparatus 100 in case that the DCI format notified in the subframe closest (recent, immediately preceding, the latest) to the subframe in which the SRS is transmitted includes the instruction of the transmission of the A-SRS. In other words, the mobile station apparatus 200 can be operated based on the DCI format notified in the subframe closest to the subframe in which the SRS is transmitted.

For example, in FIG. 7, the mobile station apparatus 200 to which a plurality of DCI formats including at least one DCI format including the instruction of the transmission of the A-SRS are notified in the specific period (for example, the period from the subframe n−1 to the subframe n+6) transmits the A-SRS in the subframe n+6. In other words, the subframe in which the mobile station apparatus 200 transmits the SRS is the subframe n+6.

In other words, in FIG. 7, the mobile station apparatus 200 can transmit the A-SRS to the base station apparatus 100 when the DCI format notified in the subframe closest to the subframe (subframe n+6) in which the SRS is transmitted includes the instruction of the transmission of the A-SRS. In other words, the mobile station apparatus 200 can be operated based on the DCI format notified in the subframe closest to the subframe (subframe n+6) in which the SRS is transmitted.

In other words, in FIG. 7, the mobile station apparatus 200 can transmit the A-SRS to the base station apparatus 100 in case that the third DCI format notified in the subframe closest to the subframe (subframe n+6) in which the SRS is transmitted includes the instruction of the transmission of the A-SRS. In other words, the mobile station apparatus 200 can be operated based on the third DCI format notified in the subframe closest to the subframe (subframe n+6) in which the SRS is transmitted.

In other words, in FIG. 7, the mobile station apparatus 200 recognizing that it is operated based on the third DCI format among a plurality of DCI formats notified from the base station apparatus 100, can transmit the A-SRS to the base station apparatus 100 in case that the third DCI format notified from the base station apparatus 100 includes the instruction of the transmission of the A-SRS. In other words, the mobile station apparatus 200 recognizing that it is operated based on the third DCI format among a plurality of DCI formats notified from the base station apparatus 100, can transmit the A-SRS to the base station apparatus 100 based on the third DCI format including the instruction of the transmission of the A-SRS.

Further, for example, the mobile station apparatus 200 recognizing that it is operated based on the third DCI format among a plurality of DCI formats notified from the base station apparatus 100, does not transmit the A-SRS to the base station apparatus 100 even if the first DCI format A and/or the second DCI format C notified from the base station apparatus 100 includes the instruction of the transmission of the A-SRS. For example, the mobile station apparatus 200 recognizing that it is operated based on the third DCI format among a plurality of DCI formats notified from the base station apparatus 100, uses the PUSCH scheduled by the third DCI format excluding the instruction of the transmission of the A-SRS to transmit the uplink data to the base station apparatus 100.

Here, the subframe (which may be the SRS subframe) in which the mobile station apparatus 200 transmits the SRS may be included in the specific period. The subframe (which may be the SRS subframe) in which the mobile station apparatus 200 transmits the SRS may be the subframe (which may be the SRS subframe) in which the mobile station apparatus 200 transmits the SRS last in the specific period. The subframe (which may be the SRS subframe) in which the mobile station apparatus 200 transmits the SRS includes the subframe in which the P-SRS is transmitted. The subframe (which may be the SRS subframe) in which the mobile station apparatus 200 transmits the SRS includes the subframe in which the A-SRS is transmitted.

In FIG. 7, the mobile station apparatus 200 to which the base station apparatus 100 notifies, in the specific period, a plurality of DCI formats, can transmit the A-SRS to the base station apparatus 100 in case that all the DCI formats include the instruction of the transmission of the A-SRS.

For example, the mobile station apparatus 200 can transmit the A-SRS to the base station apparatus 100 in case that all the DCI formats (the first DCI format, the second DCI format and the third DCI format) notified from the base station apparatus 100 include the instruction of the transmission of the A-SRS.

As has been described above, in case that the base station apparatus 100 notifies, in the specific period, the mobile station apparatus 200 of a plurality of DCI formats, if the instruction of the transmission of the A-SRS is included in a predetermined DCI format, the mobile station apparatus 200 transmits the A-SRS to the base station apparatus 100, and thus that the mobile station apparatus 200 transmits the A-SRS can be shared (recognized) between the base station apparatus 100 and the mobile station apparatus 200.

In case that the base station apparatus 100 notifies, in the specific period, the mobile station apparatus 200 of a plurality of DCI formats, if the instruction of the transmission of the A-SRS is included in the DCI format notified in the subframe closest to the subframe, the predetermined number of subframes before the subframe in which the SRS is transmitted, the mobile station apparatus 200 transmits the A-SRS to the base station apparatus 100, and thus that the mobile station apparatus 200 transmits the A-SRS can be shared (recognized) between the base station apparatus 100 and the mobile station apparatus 200.

In case that the base station apparatus 100 notifies, in the specific period, the mobile station apparatus 200 of a plurality of DCI formats, if the instruction of the transmission of the A-SRS is included in all the plurality of DCI formats, the mobile station apparatus 200 transmits the A-SRS to the base station apparatus 100, and thus that the mobile station apparatus 200 transmits the A-SRS can be shared (recognized) between the base station apparatus 100 and the mobile station apparatus 200.

The base station apparatus 100 schedules the mobile station apparatus 200 based on the A-SRS transmitted from the mobile station apparatus 200, and thereby can perform, for example, the allocation of the PUSCH resources and the determination of a modulation scheme and a coding rate performed on the PUSCH. In other words, efficient scheduling can be performed on the mobile station apparatus 200 by the base station apparatus 100.

The present invention can adopt the following aspects. Specifically, a mobile communication system of the present invention is a mobile communication system formed with a base station apparatus and a mobile station apparatus in which the base station apparatus notifies, in the same subframe, the mobile station apparatus of a plurality of downlink control formats including at least one downlink control information format including an instruction of the transmission of a sounding reference signal, and the mobile station apparatus transmits the sounding reference signal to the base station apparatus when a predetermined downlink control format among the plurality of downlink control formats includes the instruction of the transmission of the sounding reference signal.

Further, in a mobile communication system formed with a base station apparatus and a mobile station apparatus, the base station apparatus notifies, in the same subframe, the mobile station apparatus of a plurality of downlink control formats, and the mobile station apparatus transmits the sounding reference signal to the base station apparatus when all the plurality of downlink control formats include the instruction of the transmission of the sounding reference signal.

A subframe in which the mobile station apparatus transmits the sounding reference signal to the base station apparatus is a subframe a predetermined number of subframes after a subframe in which the plurality of downlink control information formats are notified from the base station apparatus.

The subframe in which the mobile station apparatus transmits the sounding reference signal to the base station apparatus is set by the base station apparatus for the mobile station apparatus specific for a cell.

In a mobile communication system formed with a base station apparatus and a mobile station apparatus, the base station apparatus notifies, in a specific period, the mobile station apparatus of a plurality of downlink control formats including at least one downlink control information format including an instruction of the transmission of a sounding reference signal, and the mobile station apparatus transmits the sounding reference signal to the base station apparatus when a predetermined downlink control format among the plurality of downlink control formats includes the instruction of the transmission of the sounding reference signal.

In a mobile communication system formed with a base station apparatus and a mobile station apparatus, the base station apparatus notifies, in a specific period, the mobile station apparatus of a plurality of downlink control formats including at least one downlink control information format including an instruction of the transmission of a sounding reference signal, and the mobile station apparatus transmits the sounding reference signal to the base station apparatus when a downlink control format notified in a subframe closest to a subframe a predetermined number of subframes before a subframe in which the sounding reference signal is transmitted includes the instruction of the transmission of the sounding reference signal.

In a mobile communication system formed with a base station apparatus and a mobile station apparatus, the base station apparatus notifies, in a specific period, the mobile station apparatus of a plurality of downlink control formats, and the mobile station apparatus transmits the sounding reference signal to the base station apparatus when all the plurality of downlink control formats include the instruction of the transmission of the sounding reference signal.

The specific period includes a period from a subframe subsequent to the subframe in which the mobile station apparatus transmits the sounding reference signal to the base station apparatus to a subframe in which the mobile station apparatus transmits the sounding reference signal again to the base station apparatus.

The subframe in which the mobile station apparatus transmits the sounding reference signal to the base station apparatus is set by the base station apparatus for the mobile station apparatus specific for a cell.

The downlink control information format including the instruction of the transmission of the sounding reference signal is arranged in a mobile station apparatus specific search region.

The downlink control information format including the instruction of the transmission of the sounding reference signal is arranged in a common search region.

A base station apparatus in a mobile communication system formed with the base station apparatus and a mobile station apparatus includes: a unit which notifies, in the same subframe, the mobile station apparatus of a plurality of downlink control formats including at least one downlink control information format including an instruction of the transmission of a sounding reference signal; and a unit which receives the sounding reference signal from the mobile station apparatus when a predetermined downlink control format among the plurality of downlink control formats includes the instruction of the transmission of the sounding reference signal.

A base station apparatus in a mobile communication system formed with the base station apparatus and a mobile station apparatus includes: a unit which notifies, in a specific period, the mobile station apparatus of a plurality of downlink control formats including at least one downlink control information format including an instruction of the transmission of a sounding reference signal; and a unit which receives the sounding reference signal from the mobile station apparatus when a predetermined downlink control format among the plurality of downlink control formats includes the instruction of the transmission of the sounding reference signal.

A mobile station apparatus in a mobile communication system formed with a base station apparatus and the mobile station apparatus includes: a unit to which a plurality of downlink control formats including at least one downlink control information format including an instruction of the transmission of a sounding reference signal is notified in the same subframe from the base station apparatus; and a unit which transmits the sounding reference signal to the base station apparatus when a predetermined downlink control format among the plurality of downlink control formats includes the instruction of the transmission of the sounding reference signal.

A mobile station apparatus in a mobile communication system formed with a base station apparatus and the mobile station apparatus includes: a unit to which a plurality of downlink control formats including at least one downlink control information format including an instruction of the transmission of a sounding reference signal is notified in a specific period from the base station apparatus; and a unit which transmits the sounding reference signal to the base station apparatus when a predetermined downlink control format among the plurality of downlink control formats includes the instruction of the transmission of the sounding reference signal.

In a communication method of a base station apparatus in a mobile communication system formed with the base station apparatus and a mobile station apparatus, a plurality of downlink control formats including at least one downlink control information format including an instruction of the transmission of a sounding reference signal is notified, in the same subframe, to the mobile station apparatus, and the sounding reference signal is received from the mobile station apparatus when a predetermined downlink control format among the plurality of downlink control formats includes the instruction of the transmission of the sounding reference signal.

In a communication method of a base station apparatus in a mobile communication system formed with the base station apparatus and a mobile station apparatus, a plurality of downlink control formats including at least one downlink control information format including an instruction of the transmission of a sounding reference signal is notified, in a specific period, to the mobile station apparatus, and the sounding reference signal is received from the mobile station apparatus when a predetermined downlink control format among the plurality of downlink control formats includes the instruction of the transmission of the sounding reference signal.

In a communication method of a mobile station apparatus in a mobile communication system formed with a base station apparatus and the mobile station apparatus, a plurality of downlink control formats including at least one downlink control information format including an instruction of the transmission of a sounding reference signal is notified, in the same subframe, from the base station apparatus, and the sounding reference signal is transmitted to the base station apparatus when a predetermined downlink control format among the plurality of downlink control formats includes the instruction of the transmission of the sounding reference signal.

In a communication method of a mobile station apparatus in a mobile communication system formed with abase station apparatus and the mobile station apparatus, a plurality of downlink control formats including at least one downlink control information format including an instruction of the transmission of a sounding reference signal is notified, in a specific period, from the base station apparatus, and the sounding reference signal is transmitted to the base station apparatus when a predetermined downlink control format among the plurality of downlink control formats includes the instruction of the transmission of the sounding reference signal.

The embodiments described above are also applied to an integrated circuit/a chip set incorporated in the base station apparatus 100 and the mobile station apparatus 200. In the embodiments described above, the base station apparatus 100 and the mobile station apparatus 200 may be controlled by recording programs for realizing the individual functions within the base station apparatus 100 and the individual functions within the mobile station apparatus 200 in a computer-readable recording medium, reading the programs recorded in the recording medium by a computer system and executing them. The "computer system" described here includes an OS and hardware such as a peripheral device.

The "computer-readable recording medium" refers to a portable medium such as a flexible disc, a magneto-optical disc, a ROM or a CD-ROM or a storage device such as a hard disc incorporated in a computer system. Furthermore, examples of the "computer-readable recording medium" include a product, such as a communication line, that holds a program shortly and dynamically when the program is transmitted through a network such as the Internet or a communication line such as a telephone line and a product, such as a volatile memory within a computer system serving as a server and a client, that holds a program for a constant period of time. The program described above may be designed to realize part of the function described above or may be designed such that the function described above can be realized by combination with the program already recorded in the computer system.

Although the embodiments of the present invention have been described in detail above with reference to the drawings, the specific configuration is not limited to the embodiments. Designs and the like without departing from the spirit of the present invention are also included in the scope of claims.

DESCRIPTION OF SYMBOLS 100 base station apparatus
101 data control portion
102 transmission data modulation portion
103 radio portion
104 scheduling portion
105 channel estimation portion
106 reception data demodulation portion
107 data extraction portion
108 higher layer
109 antenna
110 radio resource control portion
200, 200-1 to 200-3 mobile station apparatus
201 data control portion
202 transmission data modulation portion
203 radio portion
204 scheduling portion
205 channel estimation portion
206 reception data demodulation portion
207 data extraction portion
208 higher layer
209 antenna
210 radio resource control portion

The invention claimed is:

1. A base station apparatus which receives, from a user equipment (UE), a sounding reference signal, the base station apparatus comprising:
   a transmitting unit configured to transmit, to the UE, a higher layer signal including a set of first parameters and a set of second parameters;
   the transmitting unit being configured to transmit, to the UE, a first downlink control information format including information requesting the UE to transmit the sounding reference signal, the first downlink control information format being used for scheduling a physical uplink shared channel;
   the transmitting unit being configured to transmit, to the UE, a second downlink control information format including the information requesting the UE to transmit the sounding reference signal, the second downlink control information format being used for scheduling a physical downlink shared channel; and
   a receiving unit configured to receive, based on the information requesting the UE to transmit the sounding reference signal, from the UE, the sounding reference signal using the set of the first parameters or the set of the second parameters; wherein the set of the first parameters is configured for the transmission of the sounding reference signal based on the information requesting the UE to transmit the sounding reference signal, the information requesting the UE to transmit the sounding reference signal being included in the first downlink control information format; and the set of the second parameters is configured for the transmission of the sounding reference signal based on the information requesting the UE to transmit the sounding reference signal, the information requesting the UE to transmit the sounding reference signal being included in the second downlink control information format.

2. The base station apparatus according to claim 1, wherein the first downlink control information format is mapped onto a UE-specific search space.

3. The base station apparatus according to claim 2, wherein the second downlink control information format is mapped onto a UE-specific search space.

4. The base station apparatus according to claim 1, wherein a parameter relating to a bandwidth of the sounding reference signal is included in the set of the first parameters.

5. The base station apparatus according to claim 4, wherein a parameter relating to a bandwidth of the sounding reference signal is included in the set of the second parameters.

6. The base station apparatus according to claim 1, wherein a parameter relating to a cyclic shift is included in the set of the first parameters.

7. The base station apparatus according to claim 6, wherein a parameter relating to a cyclic shift is included in the set of the second parameters.

8. A user equipment (UE) which transmits, to a base station apparatus, a sounding reference signal, the UE comprising:

a receiving unit configured to receive, from the base station apparatus, a higher layer signal including a set of first parameters and a set of second parameters;

the receiving unit being configured to receive, from the base station apparatus, a first downlink control information format including information requesting the UE to transmit the sounding reference signal, the first downlink control information format being used for scheduling of a physical uplink shared channel;

the receiving unit being configured to receive, from the base station apparatus, a second downlink control information format including the information requesting the UE to transmit the sounding reference signal, the second downlink control information format being used for scheduling of a physical downlink shared channel; and a transmitting unit configured to transmit, based on a detection of the information requesting the UE to transmit the sounding reference signal, to the base station apparatus, the sounding reference signal using the set of the first parameters or the set of the second parameters; wherein the set of the first parameters is configured for the transmission of the sounding reference signal based on the detection of the information requesting the UE to transmit the sounding reference signal, the information requesting the UE to transmit the sounding reference signal being included in the first downlink control information format; and the set of the second parameters is configured for the transmission of the sounding reference signal based on the detection of the information requesting the UE to transmit the sounding reference signal, the information requesting the UE to transmit the sounding reference signal being included in the second downlink control information format.

9. The UE according to claim 8, wherein the first downlink control information format is mapped onto a UE-specific search space.

10. The UE according to claim 9, wherein the second downlink control information format is mapped onto a UE-specific search space.

11. The UE according to claim 8, wherein a parameter relating to a bandwidth of the sounding reference signal is included in the set of the first parameters.

12. The UE according to claim 11, wherein a parameter relating to a bandwidth of the sounding reference signal is included in the set of the second parameters.

13. The UE according to claim 8, wherein a parameter relating to a cyclic shift is included in the set of the first parameters.

14. The UE according to claim 13, wherein a parameter relating to a cyclic shift is included in the set of the second parameters.

15. A communication method of a user equipment (UE) which transmits, to a base station apparatus, a sounding reference signal, the communication method comprising:

receiving, from the base station apparatus, a higher layer signal including a set of first parameters and a set of second parameters;

receiving, from the base station apparatus, a first downlink control information format including information requesting the UE to transmit the sounding reference signal, the first downlink control information format being used for scheduling of a physical uplink shared channel;

receiving, from the base station apparatus, a second downlink control information format including the information requesting the UE to transmit the sounding reference signal, the second downlink control information format being used for scheduling of a physical downlink shared channel; and transmitting, based on a detection of the information requesting the UE to transmit the sounding reference signal, to the base station apparatus, the sounding reference signal using the set of the first parameters or the set of the second parameters; wherein the set of the first parameters is configured for the transmission of the sounding reference signal based on the detection of the information requesting the UE to transmit the sounding reference signal, the information requesting the UE to transmit the sounding reference signal being included in the first downlink control information format; and the set of the second parameters is configured for the transmission of the sounding reference signal based on the detection of the information requesting the UE to transmit the sounding reference signal, the information requesting the UE to transmit the sounding reference signal being included in the second downlink control information format.

16. The communication method according to claim 15, wherein the first downlink control information format is mapped onto a UE-specific search space.

17. The communication method according to claim 16, wherein the second downlink control information format is mapped onto a UE-specific search space.

18. The communication method according to claim 15, wherein
a parameter relating to a bandwidth of the sounding reference signal is included in the set of the first parameters.

19. The communication method according to claim 18, wherein
a parameter relating to a bandwidth of the sounding reference signal is included in the set of the second parameters.

20. The communication method according to claim 15, wherein
a parameter relating to a cyclic shift is included in the set of the first parameters.

\* \* \* \* \*